(12) United States Patent
Aziz et al.

(10) Patent No.: US 10,844,281 B2
(45) Date of Patent: *Nov. 24, 2020

(54) METHOD FOR SIZE CONTROLLED PREPARATION OF FUNCTIONALIZED GOLD NANOPARTICLES

(71) Applicant: KING FAHD UNIVERSITY OF PETROLEUM AND MINERALS, Dhahran (SA)

(72) Inventors: Md. Abdul Aziz, Dhahran (SA); Mohammed Nasiruzzaman Shaikh, Dhahran (SA); Zain Hassan Yamani, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 190 days.

This patent is subject to a terminal disclaimer.

(21) Appl. No.: 16/222,748

(22) Filed: Dec. 17, 2018

(65) Prior Publication Data

US 2019/0112525 A1 Apr. 18, 2019

Related U.S. Application Data

(63) Continuation of application No. 14/991,360, filed on Jan. 8, 2016, now Pat. No. 10,179,877.

(51) Int. Cl.
*C09K 11/02* (2006.01)
*C09K 11/58* (2006.01)
*B82Y 30/00* (2011.01)

(52) U.S. Cl.
CPC ............ *C09K 11/025* (2013.01); *C09K 11/58* (2013.01); *B82Y 30/00* (2013.01); *Y10S 977/774* (2013.01); *Y10S 977/902* (2013.01)

(58) Field of Classification Search
CPC ........ C09K 11/025; C09K 11/58; B82Y 30/00; Y10S 977/774; Y10S 977/902
See application file for complete search history.

(56) References Cited

U.S. PATENT DOCUMENTS

| 10,179,877 B2* | 1/2019 | Aziz | ........................ C09K 11/58 |
| 2014/0238196 A1 | 8/2014 | Young | |

OTHER PUBLICATIONS

Aziz M.A., el al., Preparation of Monodispersed Carboxylate-Functionalized Gold Nanopadicles using Pamoic Acid as a Reducing and Capping Reagent. Gold Bull. vol. 47. pp. 127-132,(2014).*
Aziz, M.A., et al., "Preparation of Monodispersed Carboxylate-Functionalized Gold Nanoparticles using Pamoic Acid as a Reducing and Capping Reagent", Gold Bull, vol. 47, pp. 127-132, (2014).

\* cited by examiner

*Primary Examiner* — C Melissa Koslow
(74) *Attorney, Agent, or Firm* — Oblon, McClelland, Maier & Neustadt, L.L.P.

(57) ABSTRACT

Monodisperse carboxylate functionalized gold nanoparticles comprising a capping agent layer of pamoic acid and colloidal suspensions thereof are disclosed. These gold nanoparticles have an average particle size of greater than 15 nm or less than 8 nm and demonstrate significant fluorescent properties. In addition, a method for the size controlled preparation of these monodisperse carboxylate functionalized gold nanoparticles wherein pamoic acid acts as both a reducing and capping agent and wherein the size of the particles can be controlled by the pH of the process is disclosed. In addition, a method for the size controlled preparation of these monodisperse carboxylate functionalized gold nanoparticles utilizing seed mediated growth is disclosed.

5 Claims, 18 Drawing Sheets

METHOD FOR SIZE CONTROLLED PREPARATION OF FUNCTIONALIZED GOLD NANOPARTICLES

CROSS-REFERENCE TO RELATED APPLICATIONS

The present application is a Continuation of Ser. No. 14/991,360, now U.S. Pat. No. 10,179,887, having a filing date of Jan. 8, 2016.

BACKGROUND OF THE INVENTION

Technical Field

The present disclosure relates to monodisperse carboxylate functionalized gold nanoparticles comprising a capping agent layer of pamoic acid and colloidal suspensions thereof. Additionally, the present disclosure relates to methods for the size controlled preparation of monodisperse pamoic acid carboxylate functionalized gold nanoparticles and colloidal suspensions thereof using pH and seed mediated growth.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Gold nanoparticles (AuNPs) and their chemical preparation have attracted much attention due to their wide application in multidisciplinary research fields such as drug deliver, electroanalysis, sensors, fuel cells, organic photovoltaics, catalysis and glass coloring [Tomar A, Garg G (2013) Global Journal of Pharmacology 7: 34-38; and Cai W, Gao T, Hong H, Sun J (2008) Nanotechnology, Science and Applications 1: 17-32.; and Saha K, Agasti S S, Kim C, Li X, Rotello V M (2012) Chem. Rev. 112: 2739-2779.; and Aziz M A, Patra S, Yang H (2008) Chem Commun: 4607-4609.; and Matsuoka K, Miyazaki K, Iriyama Y, Kikuchi K, Abe T, Ogumi Z, (2007) J. Phys. Chem. C 111: 3171-3174.; and Cattin L, Tougaard S, Stephant N, Morsli S, Bernède J C (2011) Gold Bull 44:199-205.; and Mikami Y, Dhakshinamoorthy A, Alvaro M, Garcia H (2013) Catal. Sci. Technol. 3: 58-69.; and Sharma V, Park K, Srinivasarao M (2009) Materials Science and Engineering R 65: 1-38.—each incorporated herein by reference in its entirety]. The applicability may come from their properties being highly tunable by size, shape and stabilizing or capping agents [Brülle T, Ju W, Niedermayr P, Denisenko A, Paschos O, Schneider O, Stimming U (2011) Molecules 16: 10059-10077.; and HebiéS, Kokoh K. B, Servat K, Napporn T W (2013) Gold Bull 46: 311-318.—each incorporated herein by reference in its entirety].

For the preparation of AuNPs, various methods have been developed. While the chemical reduction of gold precursor with reductant such as ascorbic acid, sodium borohydride and citrate is typical, the selection of the capping agents significantly affects the formation of AuNPs [Frens G (1973) Nature Phys Sci 241:20-22.; and Ji X, Song X, Li J, Bai Y, Yang W, Peng X (2007) J. Am. Chem. Soc. 129: 13939-13948.; and Li C, Li D, Wan G, Xu J, Hou W (2011) Nanoscale Research Letters 6:440.; and Bakshi M S, Sachar S, Kaur G, Bhandari P, Kaur G, Biesinger M C, Possmayer F, Petersen N O (2008) Cryst. Growth Des. 8: 1713-1719.; and Kumar S V, Ganesan S (2011) International Journal of Green Nanotechnology 3: 47-55.; and Londhe P U, More M, Chaure N B (2013) Proceedings of the "International Conference on Advanced Nanomaterials & Emerging Engineering Technologies" (ICANMEET-2013), Chennai, India in association with DRDO, New Delhi, India, 241h_26Ih, July: 317-319.; and Park G, Seo D, Chung I S, Song H (2013) Langmuir 29: 13518-13526.—each incorporated herein by reference in its entirety]. In addition, preparation methods in which a reagent acts simultaneously as a reducing and capping reagent have been proposed because of their simplicity [Dumur F, Guerlin A, Dumas E, Bertin D, Gigmes D, Mayer C R, (2011) Gold Bull 44:119-137.; and Rawat K A, Surati K R, Kailasa S K (2014) Anal. Methods 6: 5972-5980.; and Choi Y, Choi M, Cha S, Kim Y S, Cho S, Park Y (2014) Nanoscale Research Letters 9:103.—each incorporated herein by reference in its entirety]. In any method, the synthesis of gold nanoparticles having narrow size dispersion, i.e. monodispersity, is a crucial aspect of the nanomaterial preparation.

A simple preparation method of AuNPs has been previously reported using pamoic acid (PA) or 4,4'-methylene-bis(3-hydroxy-2-naphthalene) carboxylic acid (FIG. 1) with NaOH at room temperature [Aziz M A, Kim J, Oyama M (2014) Gold Bull 47:127-132—incorporated herein by reference in its entirety]. Although pamoic acid is insoluble in water, it can be dissolved in the presence of NaOH and functions as a capping and reducing reagent to form gold nanoparticles. The thus-formed gold nanoparticles are monodisperse with diameters of 10.8±1.2 nm and carboxylate functionality originating from the pamoic acid. These stable, mondisperse, carboxylate-functionalized gold nanoparticles were prepared without using thiols. Significantly, the size control of pamoic acid capped AuNPs has not been explored in earlier reports.

Pamoic acid is a fluorescent molecule [Baghel G S, Rao C P (2009) Polyhedron 28: 3507-3514—incorporated herein by reference in its entirety], thus the capping with pamoic acid is envisioned to provide gold nanoparticles with significant fluorescent properties as well as the carboxylate-functionality. Fluorescent gold nanoparticles could find utilization in sensors including heavy metal detection, monitoring the growth of a pathogen, imaging, etc. [Guo Y, Wang Z, Shao H, Jiang X (2012) Analyst 137: 301-304.; and Vázquez-González M, Carrillo-Carrion C (2014) Journal of Biomedical Optics 19: 101503-1-12.; and Gyanan, Khatei J (2014) Soft Nanoscience Letters 4: 69-74.; and Jiang C, Xu S, Yang D, Zhang F, Wang W (2007) Luminescence 22: 430-437.; and Chitra K, Annadurai G (2013) Journal of Nanotechnology http://dx.doi.org/10.1155/2013/509628.; and Mérian J, Gravier J, Navarro F, Texier I (2012) Molecules 17: 5564-5591.—each incorporated herein by reference in its entirety]. Some methods have been developed to prepare fluorescent AuNPs. For example, the reduction of gold precursor with NaBH$_4$ in the presence of 11-mercaptoundecanoic acid in toxic organic solvent, reduction of gold precursor with biomolecules, bovine serum albumin (BSA), and etching the pre-synthesized AuNP with hyperbranched and multivalent polymer have been reported [Xie J, Zheng Y, Ying J Y (2009) J. Am. Chem. Soc. 131: 888-889.; and Duan H, Nie S (2007) J. Am. Chem. Soc. 129: 2412-2413.— each incorporated herein by reference in its entirety].

In view of the forgoing, one object of the present disclosure is to provide a range of size controlled and monodisperse pamoic acid capped gold nanoparticles. Another aim of the present disclosure is to provide pamoic acid capped AuNPs having advantageous fluorescent properties. Furthermore, a process for the simple preparation with pamoic acid functioning as both a capping and reducing agent provides an effective versatile approach for preparing gold nanoparticles with a variety of sizes and morphologies, that are monodisperse, stable, and that have advantageous fluorescent properties. Another aim of the present disclosure is to demonstrate preparations for controlling the size of AuNPs in the chemical preparation with pamoic acid through controlling the pH to affect the size. Another aim of the present disclosure is a seed mediated growth method to fine tune the sizes of AuNPs. These methods and treatments provide the ability to tune the gold nanoparticles to desired specifications.

BRIEF SUMMARY OF THE INVENTION

According to a first aspect, the present disclosure relates to carboxylate functionalized gold nanoparticles comprising i) a gold nanoparticle core and ii) a capping agent layer comprising pamoic acid disposed on a surface of the gold nanoparticle core via interactions between a carboxyl functional group of the pamoic acid and the gold nanoparticle core, wherein the pamoic acid stabilizes the gold nanoparticle core and prevents aggregation and wherein the carboxylate functionalized gold nanoparticles are monodisperse and have an average particle size of greater than 15 nm or less than 8 nm.

According to a second aspect, the present disclosure relates to a colloidal suspension comprising i) the carboxylate functionalized gold nanoparticles and ii) a solvent and wherein the carboxylate functionalized gold nanoparticles are homogeneously dispersed in the solvent.

In one embodiment, the colloidal suspension comprises carboxylate functionalized gold nanoparticles that are monodispersed and have a particle size distribution ranging from 70% of the average particle size to 130% of the average particle size.

In one embodiment, the colloidal suspension comprises carboxylate functionalized gold nanoparticles that are monodispersed and have a particle size distribution with a relative standard deviation of less than 15%.

In one embodiment, the colloidal suspension comprises carboxylate functionalized gold nanoparticles that are monodispersed with an average particle size of 25-35 nm and a particle size distribution ranging from 20-40 nm.

In one embodiment, the colloidal suspension comprises carboxylate functionalized gold nanoparticles that are monodispersed with an average particle size of 70-80 nm and a particle size distribution ranging from 50-100 nm.

In one embodiment, the colloidal suspension comprises carboxylate functionalized gold nanoparticles in the form of at least one shape selected from the group consisting of a sphere, a rod, a rectangle, a triangle, a pentagon, a hexagon, a prism, a disk, a platelet and a cube.

In one embodiment, the solvent of the colloidal suspension comprises at least one selected from the group consisting of an aqueous solution, a polar organic solvent and a nonpolar organic solvent.

In one embodiment, the colloidal suspension comprises carboxylate functionalized gold nanoparticles having a zeta potential of greater than 30 mV or less than −30 mV.

In one embodiment, the colloidal suspension comprises carboxylate functionalized gold nanoparticles that are fluorescent with excitation wavelengths in the range of 200-550 nm and maximum emission peaks centered in the range of 300-650 nm.

In one embodiment, the colloidal suspension comprises carboxylate functionalized gold nanoparticles further comprising at least one ligand having at least one functional group bound to the gold nanoparticle core.

In one embodiment, the ligand includes at least one selected from the group consisting of a substituted alkane, a polymer, a deoxyribonucleic acid sequence, a ribonucleic acid sequence, an aptamer, an amino acid sequence, a protein, a peptide, an enzyme, an antibody, and a fluorescent marker and the functional group includes at least one selected from the group consisting of a carboxylate group, a thiol group, an amine group, and a phosphine group According to a third aspect, the present disclosure relates to a method for the size controlled preparation of monodispersed pamoic acid carboxylate functionalized gold nanoparticles comprising i) sonicating an aqueous solution of pamoic acid and an inorganic base to form a pamoic acid salt solution having a first pH ii) adding excess inorganic base to the pamoic acid salt solution to form a reducing solution having a second pH and iii) mixing the reducing solution with an aqueous solution of chloroauric acid to form mondispersed pamoic acid carboxylate functionalized gold nanoparticles in a final solution having a third pH wherein the second pH is greater than or equal to the first pH and wherein the average size of the monodispersed pamoic acid carboxylate functionalized gold nanoparticles is controlled by the second pH.

In one embodiment, the pamoic acid is a reducing agent for chloroauric acid and a capping agent for the formed monodispersed pamoic acid carboxylate functionalized gold nanoparticles.

In one embodiment, the third pH is greater than 6 and the monodispersed pamoic acid carboxylate functionalized gold nanoparticles have an average particle size of 15-30 nm or less than 8 nm.

In one embodiment, the third pH is in the range of 6-8 and the monodispersed pamoic acid carboxylate functionalized gold nanoparticles have an average particle size of less than 30 nm.

In one embodiment, the third pH is in the range of 4-6 and the monodispersed pamoic acid carboxylate functionalized gold nanoparticles have an average particle size of 30-70 nm.

In one embodiment, the third pH is less than 4 and the monodispersed pamoic acid carboxylate functionalized gold nanoparticles have an average particle size of greater than 70 nm.

According to a fourth aspect, the present disclosure relates to a method for the size controlled preparation of monodispersed pamoic acid carboxylate functionalized gold nanoparticles comprising i) sonicating an aqueous solution of pamoic acid and an inorganic base to form a pamoic acid salt solution ii) mixing the pamoic acid salt solution with an aqueous solution of chloroauric acid to form a growth solution iii) seeding a dispersion of monodispersed pamoic acid carboxylate functionalized gold nanoparticles having a first average particles size with the growth solution to form a seed solution and iv) stirring the seed solution to grow monodispersed pamoic acid carboxylate functionalized gold nanoparticles having a second average particle size and wherein the second average particle size is greater than or equal to the first average particle size.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
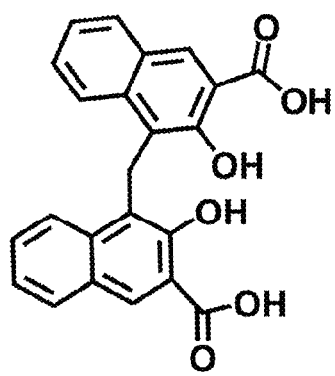
FIG. 1 is the chemical structure of pamoic acid (PA) or 4,4'-methylene-bis(3-hydroxy-2-naphthalene carboxylic acid).

Referring now to the drawings, wherein, like reference numerals designate identical or corresponding parts throughout the several views.

According to a first aspect, the present disclosure relates to carboxylate functionalized gold nanoparticles including a gold nanoparticle core. Gold (Au) is a chemical element with atomic number 79 exhibiting a face centered cubic crystal structure. In its purest form, it is a bright, slightly reddish yellow, dense, soft, malleable and ductile metal. Chemically, gold is a transition metal and a group 11 element. It is one of the least reactive chemical elements and is solid under standard conditions. The metal occurs frequently in free elemental (native) form, in a solid solutions series with the native element silver and also naturally alloyed with copper, platinum and/or palladium. Less commonly, it occurs in minerals as gold compounds, often with tellurium.

Gold has only one stable isotope, $^{197}Au$, which is also its only naturally occurring isotope, so gold is both a mononuclidic and monoisotopic element. Although gold is the most noble of the noble metals, it still forms many diverse compounds. The oxidation state of gold in its compounds ranges from $^{-}1$ to $^{+}5$. The most common oxidation states of gold include $^{+}1$, Au(I) known as gold (I) or aurous compounds and $^{+}3$, Au(III) known as gold (III) or auric compounds dominate its chemistry. Gold ions are readily reduced and precipitated as metal. Gold resists attacks by individual acids, but it can be dissolved in aqua regia, a 1:3 mixture of nitric and hydrochloric acid, causing the formation of a soluble gold tetrachloride anion. Nitric acid oxidizes the metal to $^{+}3$ ions, but only in small amounts, the ions are removed from the equilibrium by hydrochloric acid, forming $AuCl_4^-$ ions, or chloroauric acid, $HAuCl_4$.

In a preferred embodiment the gold nanoparticle core of the present disclosure substantially comprises elemental gold. The term "gold nanoparticle core" as used herein refers to an elemental gold rich material (i.e. greater than 50%, more preferably greater than 60%, more preferably greater than 70%, more preferably greater than 75%, more preferably greater than 80%, more preferably greater than 85%, more preferably greater than 90%, more preferably greater than 95%, most preferably greater than 99% elemental gold by weight), onto which a single or a plurality of capping layers are added to form a carboxylate functionalized gold nanoparticle.

In addition to elemental gold, various non-elemental gold materials including, but not limited to, gold alloys, metals and non-metals may be present in the gold nanoparticle core. The total weight of these non-elemental gold materials relative to the total wt % of the gold nanoparticle core is typically less than 50%, preferably less than 40%, preferably less than 30%, preferably less than 20%, preferably less than 15%, preferably less than 10%, more preferably less than 5%, more preferably less than 4%, more preferably less than 3%, more preferably less than 2%, most preferably less than 1%.

In addition to elemental gold, it is envisaged that the present disclosure may be adapted to incorporate gold alloys as the nanoparticle core of the carboxylate functionalized nanoparticles. Exemplary gold alloys include, but are not limited to, alloys with copper and silver (colored gold, crown gold, electrum), alloys with rhodium (rhodite), alloys with copper (rose gold, tumbaga), alloys with nickel and palladium (white gold) as well as alloys including the addition of platinum, manganese, aluminum, iron, indium and other appropriate elements and mixtures thereof. In one embodiment, it is envisaged that the present disclosure may be adapted in such a manner that the nanoparticle core substantially comprises a gold alloy.

In addition to gold, it is envisaged that the present disclosure may be adapted to incorporate other noble, precious and/or transition metal nanoparticles as the nanoparticle core of the carboxylate functionalized nanoparticles. Examples of such metals include, but are not limited to, silver (Ag), platinum (Pt), palladium (Pd), nickel (Ni), copper (Cu), osmium (Os), iridium (Ir), rhenium (Re), rhodium (Rh), ruthenium (Ru) and mixtures or alloys thereof. The present disclosure is not limited to gold and its alloys. In one embodiment, it is envisaged that the present disclosure may be adapted in such a manner that the nanoparticle core substantially comprises an alternative, noble, precious and/or transition metal.

Generally, gold nanoparticles are produced in a liquid (i.e. liquid chemical methods) and are obtained by chemical reduction of chloroauric acid ($HAuCl_4$). After dissolving chloroauric acid, the solution is rapidly stirred while a reducing agent is added. This causes $Au^{3+}$ ions to be reduced to $Au^+$ ions. Subsequently, a disproportionation reaction occurs whereby 3 $Au^+$ ions give rise to $Au^{3+}$ and 2 $Au^0$ atoms. The $Au^0$ atoms act as a center of nucleation around which further $Au^+$ ions get reduced. To prevent the particles from aggregating, some sort of stabilizing or capping agent that sticks to the nanoparticle surface is usually added. Thus, functionalizing agents for gold nanoparticles are used that display a dual role of effective reducing agents of gold salts and of stabilizers or capping agents by providing a robust coating to gold nanoparticles, within a unique reaction step. The generation of gold nanoparticles of controlled size and shape requires a strategic relationship exist between the surface of the particles and the stabilizing or capping agent. The growth of gold nanoparticles persists as long as the crystallization sites are not blocked by the capping agent and as longs as the gold (III) salt is available in the reaction medium.

Thus, to obtain gold nanoparticles of nanometer size, capping agents are introduced in the reaction medium to contain the crystal growth. For efficient entrapment of gold nanoparticles, capping agents should display a higher affinity for the surface of the nanoparticle than the solvent molecules but also subsequently act as a stabilizer preventing the aggregation of the particles. Capping agents have a critical role passivating the surface of the growing gold nanoparticle; passivation refers to a shielding outer-layer of base material, which can be applied as a microcoating. Advantageously, the capping agent should exhibit high solubility in the reaction medium and also induce mutual repulsions and repulsive interaction forces between particles to minimize particle aggregation. Capping agents are based on the generation of electrostatic repulsion forces between particles which repel each other by establishing a charged coating or capping layer at the surface of the gold nanoparticles. Alternatively, nonionic bulky capping agents are sometimes used that generate steric repulsions between particles by forming a sterically hindered coating or capping layer surrounding the surface of the gold nanoparticles. A combination of the two mechanisms is also possible, electrostatic stabilization.

The high affinity of capping agent molecules for the surface of gold nanoparticles originates in the principles of coordination chemistry. Molecules of capping agents behave with each individual gold atom at the surface of the particles in a similar way to that observed with ligands and electro-deficient metal ions in metal complexes. Therefore, a prerequisite for surfactants is to possess at least one atom or a functional group exhibiting lone pair electrons that can ensure its binding to the gold particles, for example, carboxyl and/or carboxylate functionality stabilizes the gold nanoparticle through electrostatic interactions between the lone pair of electrons on the oxygen and the metal surface. Therefore, one object of the present disclosure is to provide a coating or capping layer for gold nanoparticles that stabilizes the gold nanoparticles and prevents aggregation before, during and/or after gold nanoparticle formation processes.

The carboxylate functionalized gold nanoparticles of the present disclosure also further include a capping agent layer comprising pamoic acid disposed on at least one surface of the gold nanoparticle core via interactions between a carboxyl functional group of the pamoic acid and the gold nanoparticle core, and wherein the pamoic acid stabilizes the gold nanoparticle core and prevents aggregation. The gold nanoparticle core stabilized with a capping layer of pamoic acid is referred to herein as a "carboxylate functionalized gold nanoparticle".

Pamoic acid (PA, $C_{23}H_{16}O_6$) also called embonic acid or 4,4'-methylene-bis(3-hydroxy-2-naphthalene carboxylic acid) is a naphthoic acid derivative. The chemical structure of pamoic acid is shown in FIG. 1. Pamoic acid has two 2-naphthol units, which are bridged at position 1 of 2-naphthol by a methylene group, and each naphthol unit contains one carboxylic acid group at position 3. Salts and esters of pamoic acid are known as pamoates or embonates. In pharmacology, the salt form of pamoic acid (pamoate ion) can be used as a counter ion of a drug compound to increase the solubility of the drug in water. The presence of multiple oxygen atoms enables significant hydrogen bonding to occur, facilitating the dissolution of compounds in water. Pamoic acid is also frequently used as a ligand for making dinuclear Ti(IV) complexes. Pamoic acid is insoluble in water, but its sodium salt can be dissolved.

The molecular structure of pamoic acid features two carboxylate groups in a single molecule. In one embodiment these carboxylate groups are an anchor group that binds the gold nanoparticle core and may be considered bidentate. In one embodiment, one of the carboxylate groups may work by contacting the gold nanoparticle core and the other may be located on the outer surface. In another embodiment, it is envisaged that both carboxylate groups of a single molecule of pamoic acid may engage with and bind the gold nanoparticle core.

In one embodiment, when one of the carboxylate groups of pamoic acid is located on the outer surface it may be protonated, covalently modified and/or form a salt. Exemplary covalent modifications may include typical carboxylic acid modifications and/or isosteres including, but not limited to, esters, amines, hydroxamic acids and/or acylsulfonamides. The salt counter ions or cations are not viewed as particularly limiting and will reflect the base used in forming the pamoates which may include, but are not limited to, sodium, lithium, potassium, cesium, rubidium, ammonium, magnesium and mixtures thereof.

In one embodiment, the free hydroxyl groups of the pamoic acid framework may be modified in manners typical of hydroxyl groups, i.e. alkyl ethers. In another embodiment, several common chemical modifications to the nanphtalene reing system of pamoic acid are envisaged including, but not limited to, electrophilic aromatic substitution (i.e. chlorine) or alkylation (i.e Friedel-Crafts reactions, alkene alkylation, alcohol alkylation). As used herein, "pamoic acid" may be thought to include the basic dimeric naphthalene framework and the nanphthyl groups my be modified alpha or beta with a group $R_1$-$R_8$ which may include, but are not limited to, $C_1$-$C_{10}$ alkyl chains, halogen groups, alkoxyl groups and the like.

In another embodiment, it is envisaged that the present disclosure may be adapted to incorporate other naphthoic acid derivatives in addition to pamoic acid. Examples of such naphthoic acid derivatives include, but are not limited to, 3-hydroxy-2-naphthalene carboxylic acid, 2-hydroxy-1-naphthalene, 2-naphthol, 2-naphthoic acid, 6-amino-2-naphthoic acid, 1-naphthoic acid.

Nanoparticles are particles between 1 and 100 nm ($10^2$ to $10^7$ atoms) in size. A particle is defined as a small object that behaves as a whole unit with respect to its transport and properties. The exceptionally high surface area to volume ratio of nanoparticles may cause the nanoparticles to exhibit significantly different or even novel properties from those observed in individual atoms/molecules, fine particles and/or bulk materials. Nanoparticles can be classified according to their dimensions. Three-dimensional nanoparticles have all dimensions of less than 100 nm, and generally encompass isodimensional nanoparticles. Examples of three dimensional nanoparticles include, but are not limited to nanoparticles, nanospheres, nanogranules and nanobeads. Two-dimensional nanoparticles have two dimensions of less than 100 nm, generally including diameter. Examples of two-dimensional nanoparticles include, but are not limited to, nanotubes, nanofibers and nanowhiskers. One-dimensional nanoparticles have one dimension of less than 100 nm, generally thickness. Examples of one-dimensional nanoparticles include, but are not limited to, nanosheets, nanoplatelets, nanolaminas and nanoshells. The gold nanoparticle core and the carboxylate functionalized gold nanoparticles of the present disclosure preferably are three-dimensional nanoparticles but may be one-dimensional, two-dimensional, three-dimensional or mixtures thereof.

In the present disclosure, the gold nanoparticle core may be stabilized with a thin coating or capping agent layer, on the molecular or multilayer molecular scale. Therefore, the general shape and size of the gold nanoparticle core may dictate the shape and size of the carboxylate functionalized gold nanoparticles described herein. Nanoparticles are named for the real-world shapes that they appear to represent. These morphologies sometimes arise spontaneously as an effect of the synthesis or from the innate crystallographic growth patterns of the materials themselves. Some of these morphologies may serve a purpose, such as bridging an electrical junction.

In a preferred embodiment, the gold nanoparticle cores and carboxylate functionalized gold nanoparticles of the present disclosure are in form of a nanoparticale, which is spherical or substantially spherical (e.g. oval, oblong etc) in shape. Alternatively, it is envisaged that the gold nanoparticles may have a more polygonal shape and may be generally cubic or rectangular. However, the gold nanoparticles disclosed herein may have various shapes other than spheres and may be of any shape that provides desired synthetic activity and/or desired properties in the resulting carboxylate functionalized nanoparticles. In a preferred embodiment, the gold nanoparticle cores and the carboxylate functionalized gold nanoparticles are in the form of at least one shape, selected from the group consisting of a sphere, a rod, a rectangle, a triangle, a pentagon, a hexagon, a prism, a disk, a platelet, a cube and a nanourchin. As used herein, a nanourchin refers to a globular nanoparticle possessing a spiky uneven surface.

In one embodiment, the gold nanoparticle core and the carboxylate functionalized gold nanoparticles of the present disclosure are envisaged to be synthesized and formed into a variety of additional morphologies and forms including, but not limited to, nanoparticles, nanosheets, nanoplatelets, nanocrystals, nanospheres, nanorectangles, nanotriangles, nanopentagons, nanohexagons, nanoprisms, nanodisks, nanocubes, nanowires, nanofibers, nanoribbons, nanorods, nanotubes, nanocylinders, nanogranules, nanowhiskers, nanoflakes, nanofoils, nanopowders, nanoboxes, nanostars, tetrapods, nanobelts, nanourchins, nanoflowers, etc. and mixtures thereof.

In one embodiment, the gold nanoparticle core and the carboxylate functionalized gold nanoparticles have uniform shape. Alternatively, the shape may be non-uniform. As used herein, the term "uniform" refers to an average consistent shape that differs by no more than 10%, by no more than 5%, by no more than 4%, by no more than 3%, by no more than 2%, by no more than 1% of the distribution of gold nanoparticles having a different shape. As used herein, the term "non-uniform" refers to an average consistent shape that differs by more than 10% of the distribution of gold nanoparticles having a different shape. In one embodiment, the shape is uniform and at least 90% of the carboxylate functionalized gold nanoparticles are spherical or substantially circular, and less than 10% are polygonal or substantially square. In another embodiment, the shape is non-uniform and less than 90% of the carboxylate functionalized gold nanoparticles are spherical or substantially circular, and greater than 10% are polygonal or substantially square.

Nanoparticle characterization is necessary to establish understanding and control of nanoparticle synthesis, assembly and application. In one embodiment, the nanoparticles are characterized by at least one technique selected from the group consisting of electron microscopy (TEM, SEM) and ultraviolet-visible spectroscopy (UV-Vis). In another embodiment, it is envisioned that characterization is done using a variety of other techniques. Exemplary techniques include, but are not limited to, atomic force microscopy (AFM), dynamic light scattering (DLS), X-ray photoelectron spectroscopy (XPS), X-ray fluorescence (XRF), powder X-ray diffraction (XRD), energy-dispersive X-ray spectroscopy (EDX), thermogravimetric analysis (TGA), Fourier transform infrared spectroscopy (FTIR), matrix-assisted laser desorption/ionization time-of-flight mass spectrometry (MALDI-TOF), Rutherford backscattering spectrometry (RBS), dual polarization interferometry and nuclear magnetic resonance or mixtures thereof.

According to a second aspect, the present disclosure relates to a colloidal suspension including the carboxylate functionalized gold nanoparticles of the present disclosure, in one or more of their embodiments and including a solvent wherein the carboxylate functionalized gold nanoparticles are homogeneously dispersed in the solvent.

A colloid is a substance in which microscopically dispersed insoluble particles are suspended throughout another substance. Sometimes the dispersed substance alone is called the colloid. The term colloidal suspension refers unambiguously to the overall mixture. Unlike a solution, a colloid has a dispersed phase (the suspended particles) and a continuous phase (the medium of suspension). To qualify as a colloid, the mixture must be one that does not settle, and/or takes an appreciably long time to substantially settle. The dispersed phase particles typically have a particle size of between 1-1000 nm, preferably 1-500 nm, preferably 1-250 nm, preferably 1-100 nm. A sol is a term used to refer to a colloidal suspension of very small solid particles in a continuous liquid medium.

In a preferred embodiment, the solvent is water or substantially aqueous. In another embodiment, it is envisaged that the present disclosure may be adapted to incorporate polar protic solvents, aprotic polar organic solvents and non-polar organic solvents or mixtures thereof. Suitable polar protic solvents may include, but are not limited to, water, nitromethane, formic acid, acetic acid and short chain alcohols. Suitable short chain alcohols may include, but are not limited to, one or more of methanol, ethanol, propanol, isopropanol, butanol or the like. Suitable polar aprotic solvents may include, but are not limited to, acetone, propylene carbonate, ethylene carbonate, butyrolactone, acetonitrile, benzonitrile, nitromethane, acetonitrile, nitrobenzene, sulfolane, dimethylformamide, N-methylpyrrolidone, ethyl acetate, tetrahydrofuran, dimethyl sulfoxide or the like. Suitable non-polar solvents may include, but are not limited to, cyclohexane, octane, heptane, hexane, benzene, toluene, xylene, methylene chloride, 1,4-dioxane, chloroform, carbon tetrachloride, diethyl ether or the like. In addition, co-solvents may be used. The carboxylate functionalized gold nanoparticles of the present disclosure are envisaged as aqueous colloidal suspensions as well as concentrated and purified dried nanopowders allowing the nanoparticles to be easily transferred and redispersed as unagglomerated dispersions in a variety of different solvents enabling integration into a wide variety of systems.

The optical properties of gold nanoparticles change when particles aggregate and the conduction electrons near each particle surface become delocalized and shared amongst neighboring particles. Unaggregated gold nanoparticles will typically have a red color in solution, and if the particles aggregate the solution will appear blue/purple and can progress to a clear solution with black precipitates. In a preferred embodiment, the colloidal suspension of the present disclosure comprises unaggregated gold nanoparticles and the colloidal suspension appears red. In one embodiment, the carboxylate functionalized gold nanoparticles of the present disclosure are unaggregated and have an average surface to surface difference of greater than 0.25 times their average particle size, preferably greater than one half their average particle size, preferably greater than their average particle size, preferably greater than 1.5 times their average particle size, preferably greater than twice their average particle size. For example, spherical carboxylate functionalized gold nanoparticles having a 20 nm diameter may be separated by an average surface-to surface distance of 5-40 nm, preferably 20-30 nm or approximately 25 nm.

In one embodiment, the colloidal suspension of the present disclosure has a mass concentration of less than 5.0 mg/mL, preferably less than 1.0 mg/mL, preferably less than 0.75 mg/mL, preferably less than 0.5 mg/mL, preferably less than 0.25 mg/mL, preferably less than 0.2 mg/mL, preferably less than 0.15 mg/mL, preferably less than 0.10 mg/mL, preferably less than 0.05 mg/mL. In one embodiment, the colloidal suspension has an atomic gold molarity of less than 10 mmol/L, preferably less than 5.0 mmol/L, preferably less than 2.0 mmol/L, preferably less than 1.0 mmol/L, preferably less than 0.75 mmol/L, preferably less than 0.5 mmol/L, preferably less than 0.4 mmol/L, preferably less than 0.3 mmol/L, preferably less than 0.2 mmol/L, preferably less than 0.1 mmol/L. In one embodiment, the colloidal suspension of the present disclosure has a particle concentration of $10^5$-$10^{15}$ particles/mL, preferably $10^{6}$-$10^{14}$, preferably $10^7$-$10^{13}$, preferably $10^8$-$10^{13}$, preferably $10^9$-$10^{13}$ particles/mL. In one embodiment, the colloidal suspension has a gold mass percentage by weight of less than 1%, preferably less than 0.5%, preferably less than 0.1%, preferably less than 0.05%, preferably less than 0.01%, preferably less than 0.005%, preferably less than 0.0025%.

Colloidal gold is a sol or colloidal suspension of sub-micrometer size nanoparticles of gold in a fluid, typically water. The liquid is usually either an intense red color (for particles less than 100 nm) or blue/purple (for larger particles). Due to the unique optical, electronic and molecular-recognition properties of gold nanoparticles, they are the subject of substantial research, with applications in a wide variety of biological areas, including but not limited to, medical diagnostics, imaging, therapeutic treatments, labeling, delivering, heating and sensing as well as nanotechnology areas including, but not limited to, scaffolds for molecular recognition of elements and molecules, electron microscopy, electronics, optoelectronics, data storage, molecular switches, motors, light-harvesting assemblies and materials science. The properties of colloidal gold nanoparticles, and thus their applications, depend strongly upon their size and shape.

The electronic, optical and chemical/biological properties exploited in the several applications of gold nanoparticles are highly dependent on the tunable size, shape, surface chemisty, aggregation state and monodispersity of the gold nanoparticles. Novel properties and high performance of gold nanoparticles are present not only due to their small size, but also their uniform size. Monodisperse gold nanoparticles with a sufficiently low size variation show unique properties and higher performance as compared to their corresponding polydisperse nanoparticles.

Dispersity is a measure of the heterogeneity of sizes of molecules or particles in a mixture. In probability theory and statistics, the coefficient of variation (CV), also known as relative standard deviation (RSD) is a standardized measure of dispersion of a probability distribution. It is expressed as a percentage and is defined as the ratio of the standard deviation ($\sigma$) of to the mean ($\mu$, or its absolute value $|\mu|$). The CV or RSD is widely used to express precision and repeatability. It shows the extent of variability in relation to the mean of a population. Gold nanoparticles having narrow size dispersion, i.e. a good monodispersity is vital. As used herein, "monodisperse", "monodispersed" and/or "monodisperstiy" refers to nanoparticles having a CV or RSD of less than 25%, preferably less than 20%.

In a preferred embodiment, all gold nanoparticle cores and carboxylate functionalized gold nanoparticles described herein are monodisperse. In a more preferred embodiment, the carboxylate functionalized gold nanoparticles of the present disclosure are monodisperse with a coefficient of variation or relative standard deviation (ratio of the particle size standard deviation to the particle size mean) of less than 15%, preferably less than 12%, preferably less than 10%, preferably less than 9%, preferably less than 8%, preferably less than 7%, preferably less than 6%, preferably less than 5%, preferably less than 2%.

In one embodiment, the carboxylate functionalized gold nanoparticles of the present disclosure are monodispersed and have a particle size distribution ranging from 70% of the average particle size to 130% of the average particle size, preferably 75-125%, preferably 80%-120%, preferably 85-115%, preferably 86-114%, preferably 87-113%, preferably 88-112%, preferably 89-111%, preferably 90-110%, preferably 95%-105% of the average particle size.

The size of the gold nanoparticle core may also dictate the size of the carboxylate functionalized gold nanoparticles described herein. For spherical or substantially spherical gold nanoparticles, average particle size refers to the average longest linear diameter of the gold nanoparticles. For non-spherical gold nanoparticles, such as cubes and/or rectangles the average particle size may refer to the longest linear dimension and any of the length, width or height. In one embodiment, the carboxylate functionalized gold nanoparticles are monodispersed with an average particle size of less than 8 nm, preferably less than 7 nm, preferably less than 6 nm, preferably less than 5 nm, preferably less than 4 nm, preferably less than 3 nm, preferably less than 2 nm. In one embodiment, the carboxylate functionalized gold nanoparticles are monodispersed with an average particle size of greater than 15 nm, preferably 15-1000 nm, preferably 15-750 nm, preferably 15-500 nm, preferably 15-250 nm, preferably 15-200 nm, preferably 15-150 nm, preferably 15-100 nm, preferably 15-90 nm, preferably 15-80 nm, preferably 15-70 nm, preferably 15-60 nm, preferably 15-50 nm, preferably 15-40 nm, preferably 15-30 nm. The size may vary from these ranges and still provide acceptable carboxylate functionalized gold nanoparticles.

In one embodiment, the carboxylate functionalized gold nanoparticles are monodispersed with an average particle size of 25-35 nm, preferably 26-35 nm, preferably 27-35 nm, preferably 28-34 nm, preferably 29-33 nm, preferably 30-32 nm, preferably 30.5-31.5 nm and have a particle size distribution of 20-40 nm, preferably 22-38 nm, preferably 24-36 nm, preferably 25-35 nm, preferably 26-35 nm, preferably 27-35 nm.

In one embodiment, the carboxylate functionalized gold nanoparticles are monodispersed with an average particle size of 70-80 nm, preferably 71-80 nm, preferably 72-79 nm, preferably 73-78 nm, preferably 74-77 nm, preferably 75-76 nm and have a particle size distribution of 50-100 nm, preferably 55-95 nm, preferably 60-90 nm, preferably 65-85 nm, preferably 70-80 nm.

Zeta potential ($\zeta$-potential) is a scientific term for electrokinetic potential in colloidal dispersions. Theoretically, the zeta potential is the potential difference between the dispersion medium and the stationary layer of fluid attached to the dispersed particle. The zeta potential is a key indicator of the stability of colloidal dispersions. The magnitude of the zeta potential indicates the degree of electrostatic repulsion between adjacent, similarly charged particles in a dispersion. For molecules and particles that are small enough, a high zeta potential will confer stability, i.e. the solution or dispersion will resist aggregation. When the potential is small, attractive forces may exceed this repulsion and the dispersion may break and flocculate. Zeta potential is not measurable directly but it can be calculated using theoretical models and an experimentally determined electrophoretic mobility or dynamic electrophoretic mobility. Electrokinetic phenomena and electroacoustic phenomena are the usual sources of data for calculation of zeta potential. Thus, colloids with high zeta potential (negative or positive) are electrically stabilized while colloids with low zeta potentials tend to coagulate or flocculate.

Generally, a zeta potential from 0 to ±5 mV has stability behavior of the colloid characterized as rapid coagulation or rapid flocculation, a zeta potential from ±10 to ±30 mV is characterized as incipient stability, a zeta potential from ±30 to ±40 mV is characterized as moderate stability, a zeta potential from ±40 to ±60 mV is characterized as good stability and zeta potential of greater than ±61 mV is characterized as excellent stability. The colloidal suspension of the present disclosure may have incipient stability, moderate stability, good stability or excellent stability. In a preferred embodiment, the colloidal suspension of the present disclosure comprises carboxylate functionalized gold nanoparticles having a zeta potential of greater than 30 mV or less than −30 mV, preferably greater than 35 mV or less than −35 mV, preferably greater than 40 mV or less than −40 mV, preferably greater than 50 mV or less than −50 mV, preferably greater than 60 mV or less than −60 mV.

Fluorescence is the emission of light by a substance that has absorbed light or other electromagnetic radiation. It is a form of luminescence. In most cases, the emitted light has a longer wavelength, and therefore lower energy than the adsorbed radiation. Fluorescence has many practical applications. In one embodiment, the carboxylate functionalized gold nanoparticles are fluorescent with excitation wavelengths in the range of 200-550 nm, preferably 225-500 nm, preferably 250-450 nm, preferably 275-400 nm, preferably 275-350 nm and have emission peaks centered in the range of 300-650 nm, preferably 350-600 nm, preferably 375-550 nm, preferably 400-500 nm. It is envisaged that extensions of the present disclosure may be expected to produce fluorescent carboxylate functionalized gold nanoparticles outside these ranges of excitation wavelength and emission wavelength. In one embodiment, the pamoic acid carboxylate functionalized gold nanoparticles of the present disclosure have an emission peak intensity that is at least 5 times greater than the emission peak intensity of substantially similar citrate carboxylate functionalized gold nanoparticles without the pamoic acid capping agent layer, preferably at least 10 times greater, preferably at least 15 times greater, preferably at least 20 times greater, preferably at least 25 times greater.

In one embodiment, the carboxylate functionalized gold nanoparticles of the present disclosure further comprise at least one ligand having at least one functional group bound to the gold nanoparticle core in addition to the pamoic acid capping agent layer. The ligand may be bound covalently or via electrostatic interactions to the gold nanoparticle core or to the pamoic acid capping agent layer. In a preferred embodiment the ligand includes at least one selected from the group consisting of a substituted alkane, a polymer (PVP, PEG), a deoxyribonucleic acid sequence, a ribonucleic acid sequence, an aptamer, an amino acid sequence, a protein, a peptide, an enzyme, an antibody, and a fluorescent marker and wherein the functional group includes at least one selected from the group consisting of a carboxylate group, a thiol group, an amine group and a phosphine group. In another embodiment, the pamoic capping agent layer may further comprise one or more additional capping agents including, but not limited to, microorganisms and bacteria, plant extracts and physiological molecules, inorganic reagents and metal complexes, organic molecules, organic acids (citrate, tannic acid, lipoic acid) and salts, liposomes and polymers. In another embodiment, binding agents may be employed such as multifunctional amines including, but not limited to, N-aminoethylpiperazine (AEP), ethylene diamine (ED), and/or tetraethylenepentamine (TEPA).

In a preferred embodiment, the carboxylate functionalized gold nanoparticles of the present disclosure have a weight percentage of the pamoic acid capping layer ranging from 0.025-5%, preferably 0.05-2.5%, preferably 0.1-1.5%, more preferably 0.2-1.0% relative to the total weight of the carboxylate functionalized gold nanoparticles. In another embodiment, the total weight percent of the carboxylate functionalized gold nanoparticles that is not the gold nanoparticle core is greater than 30% by weight pamoic acid, preferably greater than 50%, preferably greater than 60%, preferably greater than 70%, preferably greater than 80% by weight pamoic acid and less than 70% by weight the additional ligand or ligands, preferably less than 50%, preferably less than 40%, preferably less than 30%, preferably less than 20% by weight the additional ligand or ligands.

The capping agent layer may "substantially cover" the surface of the gold nanoparticle core, whereby the percent surface area coverage of the surface being capped is at least 75%, at least 85%, at least 90%, at least 95%, at least 96%, at least 97%, at least 98%, at least 99%. In some cases, the capping agent layer may "incompletely cover", or only cover portions of the surface of the gold nanoparticle core, whereby the percent surface area coverage of the surface being capped is less than 75%, less than 65%, less than 60%, less than 55%, less than 50%, less than 45%, less than 40%, less than 35%, less than 30%, less than 25%, less than 20%, less than 15%, or 10%.

The capping agent layer may refer to one material (i.e. pamoic acid) that covers a surface being capped, or alternatively, the capping agent layer may refer to a mixture of interspersed individual materials including pamoic acid and an additional ligand or additional ligands or sequential applications of individual materials including pamoic acid and an additional ligand or additional ligands. With sequential applications of individual materials, it may be possible to form distinct layers and these distinct layers may have a defined interface. The capping agent layer may also refer to a single application of a material or a plurality of applications of the same material and may comprise a monolayer, a bilayer, a trilayer and/or a multilayer.

In a preferred embodiment, the capping agent layer substantially covers the gold nanoparticle core, where the capping agent layer comprising pamoic acid covers greater than 75%, preferably greater than 80%, preferably greater than 85%, preferably greater than 90%, preferably greater than 95% of the surface of the gold nanoparticle core. Alternatively, the capping agent layer may only cover a portion of the surface of the gold nanoparticle core (i.e. incompletely cover), where the capping agent layer comprising pamoic acid covers less than 70%, less than 65%, less than 60%, less than 55%, less than 50%, less than 40%, less than 30%, less than 25%, less than 20%, less than 15%, less than 10% of the surface of the gold nanoparticle core and the capping agent layer may still stabilize the gold nanoparticle core and prevent aggregation. One of two surfaces in contact possessing a capping agent layer may be sufficient to prevent aggregation.

In one embodiment, it is envisioned that the colloidal suspension of the present disclosure may further comprise additives, which are added to change the properties of the colloid. These additives may include, but are not limited to a surfactant, an antifoaming agent or defoamer, a stabilizing agent and/or a scale inhibitor.

Surfactants are compounds that lower the surface tension (or interfacial tension) between two liquids or between a liquid and a solid. Surfactants may act as detergents, wetting agents, emulsifiers, foaming agents, stabilizing agents and dispersants. Surfactants are common components in colloids used in a variety of applications in order to better disperse the solid particles in the solvent, thus improving the properties of the colloid. The surfactants may also make the dispersion easier to process. Surfactants may also stabilize the dispersions by inhibiting crystallization or precipitation of the nanoparticles. Types of surfactants may include amphoteric, cationic, anionic, and nonionic surfactants. Examples of surfactants include, but are not limited to, ammonium lauryl sulfate, sodium lauryl sulfate (SDS, sodium dodecyl sulfate), sodium lauryl ether sulfate, sodium myreth sulfate, dioctyl sodium sulfosuccinate, perfluorooctanesulfonate, perfluorooctanoate, octenidine dihydrochloride, cetyl trimethylammonium bromide (CTAB), cetyl timethyl ammonium chloride, cetylpyridinium chloride, benzalkonium chloride, benzethonium chloride, 5-bromo-5-nitro-1,3-dioxande, cocamidopropyl hydroxysultaine, dimethyldioctadecylammonium chloride, cetrimonium bromide, dioctadecyldimethylammonium bromide, sphnigomyelins, cocamidopropyl betaine, phosphatidylserine, phophatidylethanolamine, phosphatidylcholine, octaethylene glycol monododecyl ether, pentaethylene glycol monododecyl ether, decyl glucoside, lauryl glucoside, octyl glucoside, Triton X-100, nonoxynol-9, glyceryl laurate, dodecyldimethylamine oxide, poloxamers, vinyl polymers and copolymers having substituents that are hydroxyl, alkyl, acyloxy, and cyclic amides, polyvinyl alcohol-polyvinyl acetate copolymers, polyvinylpyrrolidone, polyethylene-polyvinyl alcohol copolymers, polyvinylpyrrolidone-polyvinyl acetate copolymers and mixtures thereof.

Exemplary antifoaming agents or defoamers include, but are not limited to polydimethylsiloxane emulsion based antifoams, ethylene oxide-propylene oxide copolymers, silicone antifoam agents (SAG 10), an ethylene oxide-propylene oxide (EO-PO) block copolymer, a propylene oxide-ethylene oxide-propylene oxide (PO-EP-PO) block copolymer, poly(ethylene oxide) or poly(propylene oxide) (PPG 2000, polypropylene oxide with an average molecular weight of 2000), a hydrophobic amorphous silica, a polydiorganosiloxane based product (PDMS, polydimethylsiloxane), a fatty acid or fatty acid ester (stearic acid), a fatty alcohol, an alkoxylated alcohol, a polyglycol, a polyether polyol acetate, a polyether ethoxylated sobital hexaoleate, a poly(ethylene oxide-propylene oxide)monoallyl ether acetate, a wax, a naphtha, kerosene, an aromatic oil and mixtures thereof.

Exemplary scale inhibitors include, but are not limited to phosphonates, acrylic co/ter-polymers, polyacrylic acid (PAA), phosphino carboxylic acid (PPCA), and phosphate esters. These include 1-hydroxyethane-1,1-diphosphonic acid (HEDP, etidronic acid), aminotris(methyl enephosphonic acid) (ATMP), diethylenetriamine penta(methylene phosphonic acid) (DTPMP), 2-hydroxyethyliminobis(methylene phosphonic acid) (HEBMP), polyacrylates, phosphonomethylated amines, polyphosphonic acids, other traditional aqueous-based scale inhibitor chemistries and derivatives, salts and mixtures thereof.

According to a third aspect, the present disclosure relates to a method for the size controlled preparation of monodispersed pamoic acid functionalized gold nanoparticles, in any of their embodiments involving i) sonicating an aqueous solution of pamoic acid and an inorganic base to form a pamoic acid salt solution having a first pH ii) adding excess inorganic base to the pamoic acid salt solution to form a reducing solution having a second pH and iii) mixing the reducing solution with an aqueous solution of chloroauric acid as a source of gold (III) to form monodispersed pamoic acid carboxylate functionalized gold nanoparticles in a final solution having a third pH, wherein the second pH is greater than or equal to the first pH and wherein the average size of the monodispersed carboxylate functionalized gold nanoparticles is controlled by the second pH.

In a preferred embodiment, the second pH is greater than the first pH and the average size of the monodispersed carboxylate functionalized gold nanoparticles is controlled by the second pH. Increasing or decreasing the excess amount of inorganic base added increases or decrease the difference between the second pH and first pH. As the second pH increases, the size of the monodispersed pamoic acid carboxylate functionalized gold nanoparticles produced by the method decreases. The second pH controls the amount of carboxyl functionalized pamoate salts and pamoic acid in aqueous solution and thus available as a suitable capping agent. An increase in the amount of available suitable capping agent leads to less gold particle $Au^0$ aggregation and consequently relatively smaller gold nanoparticles.

In one embodiment, the pamoic acid acts as both a reducing agent for chloroauric acid and as a capping agent for the formed monodispersed pamoic acid carboxylate functionalized gold nanoparticles. In another embodiment, the pamoic acid may serve as only the capping agent or only the reducing agent and one or more additional reducing or capping agents may be used including, but not limited to, microorganisms and bacteria, plant extracts and physiological molecules, inorganic reagents and metal complexes, organic molecules, organic acids and salts, liposomes and polymers. Exemplary alternative reducing and stabilizing agents include, but are not limited to, sodium borohydride ($NaBH_4$), sodium citrate, tannic acid, hydroquinone, tetraoctylammonium bromide (TOAB), sodium acetylacetonate (Na(acac)).

In a preferred embodiment, the source of gold is preferably a source of gold (III), and most preferably chloroauric acid ($HAuCl_4$). In another embodiment, it is envisaged that the present disclosure may be adapted to incorporate other sources of gold (III) in addition to chloroauric acid including, but not limited to, gold (III) chloride hydrate, gold (III) chloride, gold (III) chloride trihydrate, gold (III) bromide, gold (III) oxide hydrate, gold (III) sulfide, gold (III) hydroxide, potassium gold (III) chloride, trichloro(pyridine)gold (III) and mixtures thereof.

In a preferred embodiment, the inorganic base is a strong base, preferably a hydroxide of an alkali metal or an alkaline earth metal, most preferably sodium hydroxide (NaOH). Examples of alkali metal and alkaline earth metal hydroxides include, but are not limited to, sodium hydroxide (NaOH), lithium hydroxide (LiOH), potassium hydroxide (KOH), rubidium hydroxide (RbOH), cesium hydroxide (CsOH), magnesium hydroxide ($Mg(OH)_2$), strontium hydroxide ($Sr(OH)_2$), barium hydroxide ($Ba(OH)_2$), zinc hydroxide ($Zn(OH)_2$), calcium hydroxide ($Ca(OH)_2$), ammonium hydroxide (NH$_4$OH) and mixtures thereof. In another embodiment, the inorganic base may include carbonates and/or bicarbonates including, but not limited to, ammonium carbonate, barium carbonate, cesium carbonate, lithium carbonate, magnesium carbonate, nickel carbonate, potassium carbonate, potassium bicarbonate, rubidium carbonate, sodium carbonate, sodium bicarbonate, strontium carbonate and mixtures thereof. Additional exemplary bases include, but are not limited to, titanium (III) chloride, sodium amide, soda lime (CaO/NaOH), 4-piperidinopyridine, lithium amide, ammonia, acetaldehyde ammonia trimer and mixtures thereof. The selection of a base is not envisioned to be particularly limiting as long as desired pH ranges are obtained.

In one embodiment, the third pH is greater than 6 and the monodispersed pamoic acid carboxylate functionalized gold nanoparticles have an average particle size of 15-30 nm or less than 8 nm. The pH is preferably greater than 6, preferably greater than 6.25, preferably greater than 6.5, preferably greater than 6.75, preferably greater than 7, preferably greater than 7.25, preferably greater than 7.5, preferably greater than 7.75, preferably greater than 8, preferably greater than 8.25, preferably greater than 8, preferably greater than 8.5, preferably greater than 8.75, preferably greater than 9, preferably greater than 9.5, preferably greater than 10 and the monodispersed pamoic acid carboxylate functionalized gold nanoparticles have an average particles size of 15-30 nm, preferably 17.5-27.5 nm, preferably 20-25 nm or less than 8 nm, preferably less than 7 nm, preferably less than 6 nm, preferably less than 5 nm, preferably less than 2 nm.

In one embodiment, the third pH is in the range of 6-8 and the monodispersed pamoic acid carboxylate functionalized gold nanoparticles have an average particle size of less than 30 nm. The pH is preferably 6-8, preferably 6.25-7.75, preferably 6.5-7.5, preferably 6.75-7.25 and the monodispersed pamoic acid carboxylate functionalized gold nanoparticles have an average particle size of less than 30 nm, preferably less than 25 nm, preferably less than 20 nm, preferably less than 15 nm, preferably less than 14 nm, preferably less than 13 nm, preferably less than 12 nm, preferably less than 11 nm, preferably less than 10 nm, preferably less than 9 nm, preferably less than 8 nm, preferably less than 5 nm.

In one embodiment, the third pH is in the range of 4-6 and the mondispsersed pamoic acid carboxylate functionalized gold nanoparticles have an average particle size of 30-70 nm. The pH is preferably 4-6, preferably 4.25-5.75, preferably 4.5-5.5, preferably 4.75-5.25 and the monodispersed pamoic acid carboxylate functionalized gold nanoparticles have an average particle size of 30-70 nm, preferably 35-65 nm, preferably 40-60 nm, preferably 45-55 nm, or 50 nm.

In one embodiment, the third pH is less than 4 and the monodispersed pamoic acid carboxylate functionalized gold nanoparticles have an average particle size of greater than 70 nm. The pH is preferably less than 4, preferably less than 3.75, preferably less than 3.5, preferably less than 3.25, preferably less than 3 and the monodispersed pamoic acid carboxylate functionalized gold nanoparticles have an average particle size of greater than 70 nm, preferably greater than 75 nm, preferably greater than 80 nm, preferably greater than 85 nm, preferably greater than 90 nm, preferably greater than 95 nm, preferably greater than 100 nm, preferably greater than 150 nm, preferably greater than 200 nm, preferably greater than 250 nm, preferably greater than 300 nm, preferably greater than 400 nm, preferably greater than 500 nm, preferably greater than 750 nm, preferably greater than 1000 nm.

According to a fourth aspect, the present disclosure relates to a method for the size controlled preparation of monodispersed pamoic acid functionalized gold nanoparticles involving i) sonicating an aqueous solution of pamoic acid and an inorganic base to form a pamoic acid salt solution ii) mixing the pamoic acid salt solution with an aqueous solution of chloroauric acid as a source of gold (III) to form a growth solution iii) seeding a dispersion of monodispersed pamoic acid carboxylate functionalized gold nanoparticles, in any of their embodiments, having a first average particle size with the growth solution to form a seed solution and iv) stirring the seed solution to grow monodispersed pamoic acid carboxylate functionalized gold nanoparticles having a second average particle size and wherein the second average particle size is greater than or equal to the first average particle size. The techniques for preparing the monodispersed pamoic acid carboxylate functionalized gold nanoparticles having a first particle size, appropriate inorganic bases and appropriate sources of gold (III) have been described previously.

In one embodiment, the stirring to grow the carboxylate functionalized gold nanoparticles is performed at 10-500 rpm, preferably 50-400 rpm, preferably 100-300 rpm, preferably 150-250 rpm, or 200 rpm. In one embodiment, the duration of the stirring to grow the carboxylate functionalized gold nanoparticles may be up to 72 hours, preferably up to 48 hours, preferably up to 24 hours, preferably up to 12 hours, preferably up to 8 hours.

In a preferred embodiment, the second particle size is greater than or equal to the first particle size indicating that the AuCl$_4^-$ reduced on the surface of the monodispersed gold nanoparticle seeds rather than forming separate gold nanoparticles in the growth solution. This results in monodisperse, slightly larger gold nanoparticles by this seed mediated growth mechanism. In another embodiment, the second particle size can be controlled by the amount of monodispersed carboxylate functionalized gold nanoparticles having a first particle size added as seed to the growth solution. In one embodiment, as the amount of monodispersed carboxylate functionalized gold nanoparticles having a first particle size added as seed to the growth solution increases, the difference between the first particle size and the second particle size decreases. In a preferred embodiment, the second particle size is 100-500% of the first particle size, preferably 100-400%, preferably 100-300%, preferably 100-250%, preferable 100-200%, preferably 100-175%, preferably 100-150%, preferably 100-125%, preferably 100-120%, preferably 100-115%, preferably 100-110%, preferably 100-105% of the first particle size.

In one embodiment, the first particle size is 1-250 nm, preferably 1-200 nm, preferably 1-150 nm, preferably 1-100 nm, preferably 1-75 nm, preferably 1-50 nm, preferably 1-25 nm, preferably 1-20 nm, preferably 1-15 nm, preferably 1-10 nm, preferably 1-5 nm and the second particle size is 1-1000 nm, preferably 1-800 nm, preferably 1-600 nm, preferably 1-400 nm, preferably 1-300 nm, preferably 1-200 nm, preferably 1-100 nm, preferably 1-80 nm, preferably 1-60 nm, preferably 1-40 nm, preferably 1-30 nm, preferably 1-25 nm, preferably 1-20 nm, preferably 1-15 nm, preferably 1-10 nm.

The examples below are intended to further illustrate protocols for preparing and characterizing the carboxylate functionalized gold nanoparticle and the colloids of the present disclosure. Further, they are intended to illustrate assessing the properties of these nanoparticles and colloids. They are not intended to limit the scope of the claims.

Example 1

Chemicals

Hydrogen tetrachloroaurate trihydrate (HAuCl$_4$.3H$_2$O), pamoic acid (PA), sodium hydroxide and sodium citrate (Na$_3$-citrate) dihydrate were all purchased from Sigma-Aldrich Company and utilized directly without further purification. All solutions were prepared with ultrapure deionized water obtained from a water purification system (Millipore WR600A, Yamato Co., Japan and/or Barnstead Nanopure, Thermoscientific 7148, USA).

Example 2

Synthesis of Gold Nanoparticles (AuNPs) by Controlling the Alkali

As a typical preparation method of gold nanoparticles (AuNPs) with pamoic acid (PA), 7.9 mg of pamoic acid was placed in a test tube and 9.0 mL of pure water was added followed by sonication for 15 min. 40 µL of 1.0M NaOH (aq.) was then added to the solution, and pure water was subsequently added to make the total volume 10.0 mL. The mixture was then sonicated for 15 min to form a clear 2.0 mM solution of the disodium salt of pamoic acid (Na$_2$-pamoic acid). Next, excess 100 µL of 1.0M NaOH (aq.) was added to the clear solution and sonicated for 1 min; then, 10 mL of a 1.34 mM solution of HAuCl$_4$ (aq.) was added to the above solution under sonication, and the sonication was continued for 15 min. Finally, the solution was stored for 60 min to allow the complete formation of the gold nanoparticles. Similarly, the different sizes of pamoic acid capped gold nanoparticles were obtained by simply varying the excess volume of 1.0M NaOH. For example, an excess 40 µL volume, an excess 20 µL volume, or an excess 5 µL volume of excess 1.0M NaOH may be added rather than the excess 100 µL volume.

Similar preparations were carried out to produce the citrate capped gold nanopaprticles for comparison. The citrate capped gold nanoparticles were synthesized with little modification of the previous report [Hill H D, Mirkin C A (2006) Nature Protocols 1: 324-336—incorporated herein by reference in its entirety]. Briefly, 100 mL of 1 mM hydrogen tetrachloroaurate (III) trihydrate (aq.) was reduced by 10 mL of 38.8 mM Na$_3$-citrate under refluxing conditions to generate appropriate gold colloids.

Example 3

Size Controlling the Gold Nanoparticles by a Seed Mediated Growth Approach

Here, the pamoic acid capped gold nanoparticles prepared with a 100 µL excess of 1.0 M NaOH were used as seed. 5 mL or 2.5 mL of the gold nanoparticles seed solution were added to the mixture of 10 mL of 1.34 mM HAuCl$_4$ (aq.) and 10 mL of 2 mM Na$_2$-pamoic acid (aq.) under stirring conditions (200 rpm), and stirring was continued for 24 hours to complete the growth of the gold nanoparticles.

Example 4

Instrumentation and Characterization

The absorption spectra were recorded by UV-Vis spectrophotometer, JASCO V-670. To record the UV spectra of gold nanoparticle solutions, all the gold nanoparticle solutions were diluted with ultrapure water to get the same concentration of Au (0.1663 mM of Au atom). The pH of the gold nanoparticle solutions were recorded by Dual Cannel pH meter, XL60, Fisher Scientific. X-ray photoelectron spectroscopic analyses and transmission electron microscopic (TEM) images were obtained using JEM-2011 (JEOL corp.) at the Korea Basic Science Institute, Busan Center, Korea.

Fluorescence measurements were performed by Spectrofluorometer, Fluorolog FL3-iHR, HORIBA Jobin Yvon, France. Zeta potential was measured by ZEN 2600, Malvern Instruments Ltd, UK. Before recording the fluorescence spectra and zeta potential, the gold nanoparticle solutions were centrifuged to remove the unbound pamoic acid and subsequently re-dispersed in ultrapure water to get the same concentration of Au (0.1663 mM Au atom) in each sample.

In preparing some samples for the TEM and X-ray photoelectron spectroscopy (XPS) measurements, the prepared solution of the gold nanoparticles with pamoic acid was centrifuged at 12,000 rpm and the obtained sediment was redispersed in 1 mM NaOH (aq.). The centrifugation and redispersion processes were repeated three times to remove any free or loosely bound molecules. For the TEM analysis, the gold nanoparticles were transferred to a copper grid by dipping it into the purified alkaline solution of the gold nanoparticles. For the XPS analysis, the purified alkaline solution of the gold nanoparticles was dropped onto a cleaned indium tin oxide (ITO) substrate and dried at 40° C.

In preparing the gold nanoparticle modified ITO, a piece of ITO was immersed overnight in ethanol containing 2% APTMS (v/v) at room temperature, and the amine terminated ITO was prepared. After washing with ethanol, the electrode was dried by flowing nitrogen. Additionally, the solution of the gold nanoparticles was centrifuged at 12,000 rpm and the supernatant was decanted. The obtained sediment was redispersed in water. The centrifugation and redispersion process was repeated three times. The APTMS-modified ITO was dipped in the purified aqueous gold nanoparticle solution for 2 hr. After washing with water, the modified ITO electrode was dried at 40° C.

Example 5

Confirming the Capping States of the Prepared Gold Nanoparticles

To confirm the capping states of the gold nanoparticles by pamoic acid, 0.15 mL aqueous solution of 6.7 mM Cd-(NO$_3$)$_2$, i.e., Cd$^{2+}$, to a 1.35 mL aqueous solution of the gold nanoparticles, which was prepared by centrifuging and redispersing the gold nanoparticles in water to remove any unbound pamoic acid. As a result, the color of the solution is changed. It is known that such a color change is due to the aggregation of the gold nanoparticles and that, when the carboxylate groups are present on the surfaces of the gold nanoparticles, the aggregation proceeds in the presence of divalent cations, such as Cd$^{2+}$, Hg$^{2+}$, and Pd$^{2+}$. Thus, it was shown that carboxylate groups are present on the surfaces of the present gold nanoparticles prepared with pamoic acid. This is reasonable judging from the molecular structure of pamoic acid having two carboxylate groups in one molecule, because the carboxylate groups can be an anchor group to bind Au. It is also considered that one of the carboxylate groups may work by contacting with Au and that the other may be located on an outer surface.

Example 6

Figure 2A:
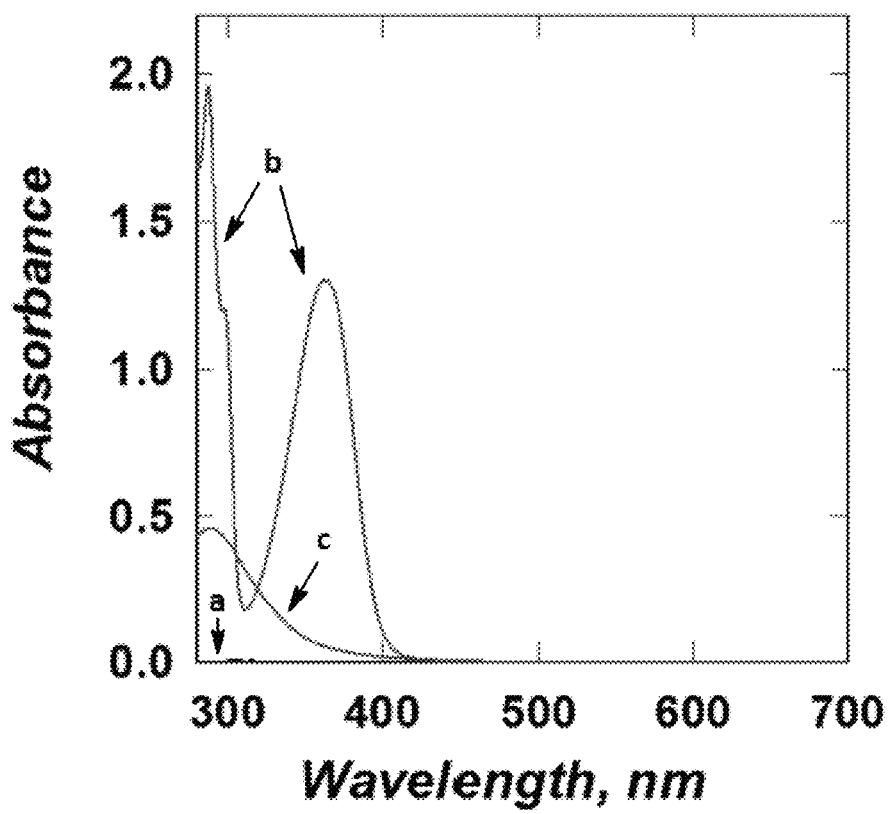
FIG. 2A is ultraviolet-visible (UV-Vis) spectra wherein (a) is the UV-Vis spectra of 0.25 mM $Na_3$-citrate, (b) is the UV-Vis spectra of 0.25 mM $Na_2$-pamoic acid, and (c) is the UV-Vis spectra of 0.1675 mM $HAuCl_4$.

Ultraviolet-Visible (UV-Vis) Analysis of the Reactants and the Prepared Gold Nanoparticles The capping molecules play an important role in the properties of gold nanoparticles. In the classical citrate method, citrate acts as a reductant as well as a capping agent, whereas in the present developed method, pamoic acid takes that role. Accordingly, the UV spectra of the aqueous solutions of reactants were recorded. FIG. 2A (a) is 0.25 mM Na$_3$-citrate. FIG. 2A (b) is 0.25 mM Na$_2$-pamoic acid. FIG. 2A (c) is 0.1663 mM HAuCl$_4$. The UV spectra were recorded systematically before starting the preparation of gold nanoparticles in order to predict the optical properties. The UV spectrum of sodium citrate did not show any absorption in the entire testing wavelengths (280-700 nm) and is accordingly baseline. In contrast, Na$_2$-pamoic acid shows significant absorbance with λmax at 285, 300 and 363 nm (FIG. 2A (b)). In addition, HAuCl$_4$ shows the absorption peak at 289 nm (FIG. 2A (c)) due to metal to ligand charge transfer. The absorption peak of metal to ligand charge disappears after reducing the gold ion with sodium citrate (FIG. 2B (a)), and a new absorption peak appears at 519 nm, which is a characteristic peak of around 13 nm gold nanoparticles.

In the inventors' previous report [Aziz M A, Kim J, Oyama M (2014) Gold Bull 47:127-132—incorporated herein by reference in its entirety], an excess volume of 100 µL of 1M NaOH was added to the solution of Na$_2$-pamoic acid. Next, the solution was mixed with 1.34 mM HAuCl$_4$ (aq.) under sonication conditions, and the sonication was continued for 15 min. During the sonication, the color of the solution changed from yellow to blackish, and then deep red, which indicated the formation of the gold nanoparticles. Next, the reaction mass was stored for 60 min undisturbed to allow the complete formation of the gold nanoparticles. A deep red color was observed and noted for the thus prepared gold nanoparticle solutions. However, the reaction rate decreased when the excess volume of 1M NaOH was decreased, even though these procedures were similar to the inventors' earlier report. In the instance of using and excess 40 µL volume of 1M NaOH, a full day was required to complete the reaction after the 15 min. sonication. Whereas, two and three days were required for the cases of using excess 20 µL and excess 5 µL volumes of 1M NaOH, respectively for completing the formation of the gold nanoparticles. The cause of the slow reaction rate may be due to pH of the reaction mass, as the pH of the synthesized gold nanoparticle solutions were found to decrease with decreasing excess volumes of NaOH (Table 1). The mode of the color change was also different for individual alkali cases. Reddish-violet, reddish-blue and brown colors were observed for the cases of using excess 40 µL, 20 µL and 5 µL volumes of 1M NaOH, respectively. The difference in colors indicates the different shape and/or different sizes of the synthesized gold nanoparticles. It is notable that all of the synthesized gold nanoparticles are stable without precipitation except the case of using an excess 5 µL volume of 1M NaOH. In this case, the prepared gold nanoparticles precipitated gradually. The precipitated gold nanoparticles could easily be redispersed quickly by manual shaking and this trend is common with commercially available larger sizes of gold nanoparticles.

Figure 2B:
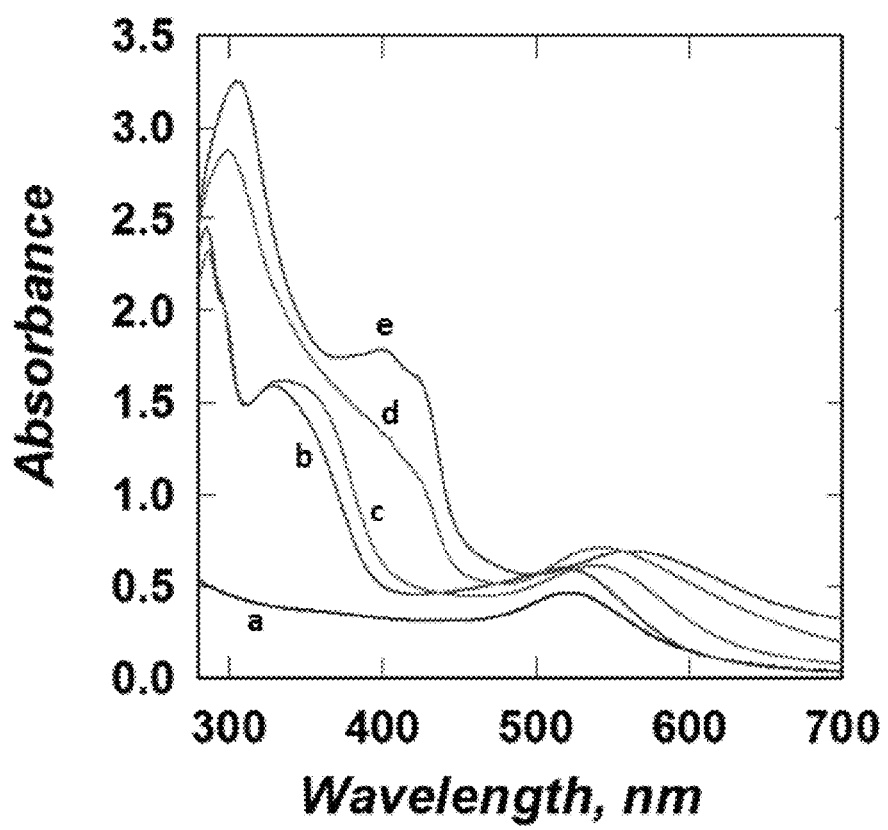
FIG. 2B is UV-Vis spectra wherein (a) is the UV-Vis spectra of citrate capped gold nanoparticles and (b) is the UV-Vis spectra of pamoic acid capped gold nanoparticles prepared by using an excess 100 μL volume of 1M NaOH, (c) is the UV-Vis spectra of pamoic acid capped gold nanoparticles prepared by using an excess 40 μL volume of 1M NaOH, (d) is the UV-Vis spectra of pamoic acid capped gold nanoparticles prepared by using an excess 20 μL volume of 1M NaOH and (e) is the UV-Vis spectra of pamoic acid capped gold nanoparticles prepared by using an excess 5 μL volume of 1M NaOH.

In addition, the characteristic absorption peak (>500 nm for this disclosure) of gold nanoparticles was found to increase with a decrease in the excess volume of 1M NaOH (aq.) solution used in their preparation. This phenomenon indicates that the increase in the size of gold nanoparticles by decreasing the excess volume of 1M NaOH (aq.) (FIG. 2B). The absorption peaks of pamoic acid capped gold nanoparticles using different volumes of 1M NaOH are different in using lower wavelengths (<500 nm) as well. The absorption peaks of different pamoic acid capped gold nanoparticles prepared by controlling the volume of 1 M NaOH are summarized in Table 1.

Example 7

Figure 3A:
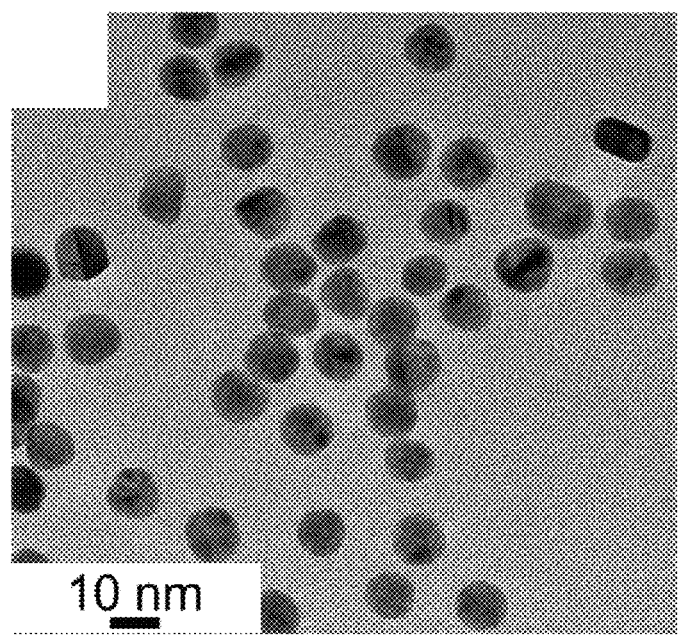
FIG. 3A is a transmission electron microscopy (TEM) image of the prepared citrate capped gold nanoparticles.
Figure 3B:
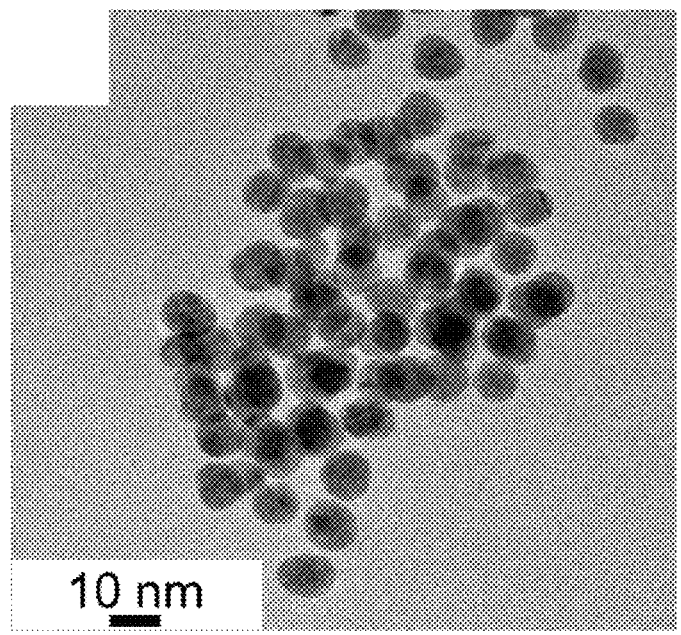
FIG. 3B is a TEM image of the pamoic acid capped gold nanoparticles prepared using an excess 100 μL volume of 1M NaOH.
Figure 3C:
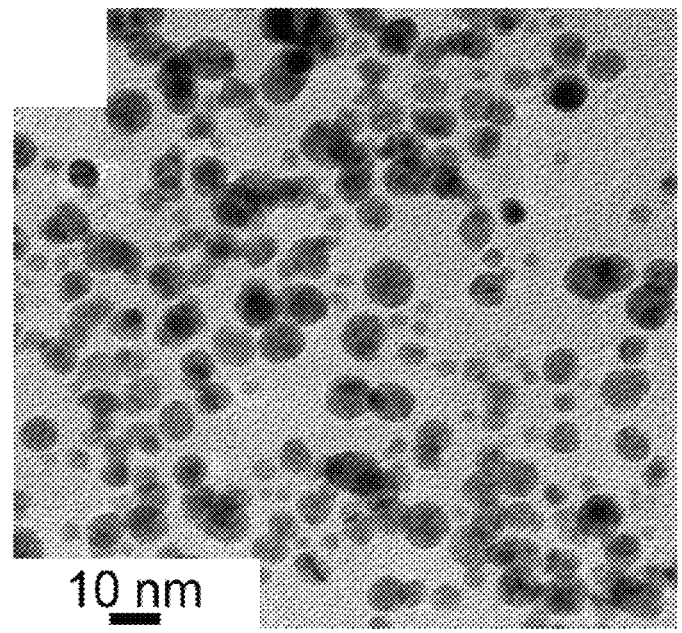
FIG. 3C is a TEM image of the pamoic acid capped gold nanoparticles prepared using an excess 40 μL volume of 1M NaOH.
Figure 3D:
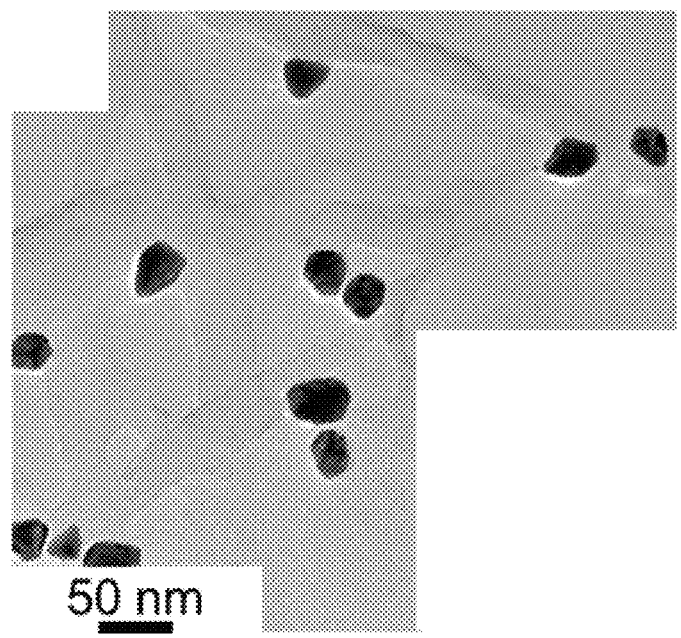
FIG. 3D is a TEM image of the pamoic acid capped gold nanoparticles prepared using an excess 20 μL volume of 1M NaOH.
Figure 3E:
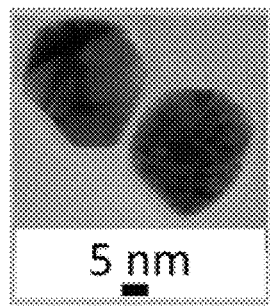
FIG. 3E is a TEM image of the magnified view of the pamoic acid capped gold nanoparticles prepared using an excess 20 μL volume of 1M NaOH.
Figure 3F:
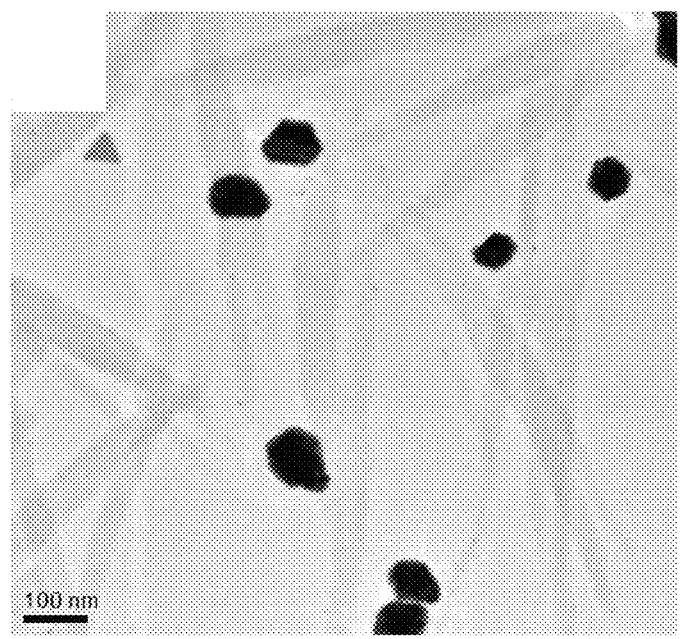
FIG. 3F is a TEM image of the pamoic acid capped gold nanoparticles prepared using an excess 5 μL volume of 1M NaOH.
Figure 4A:
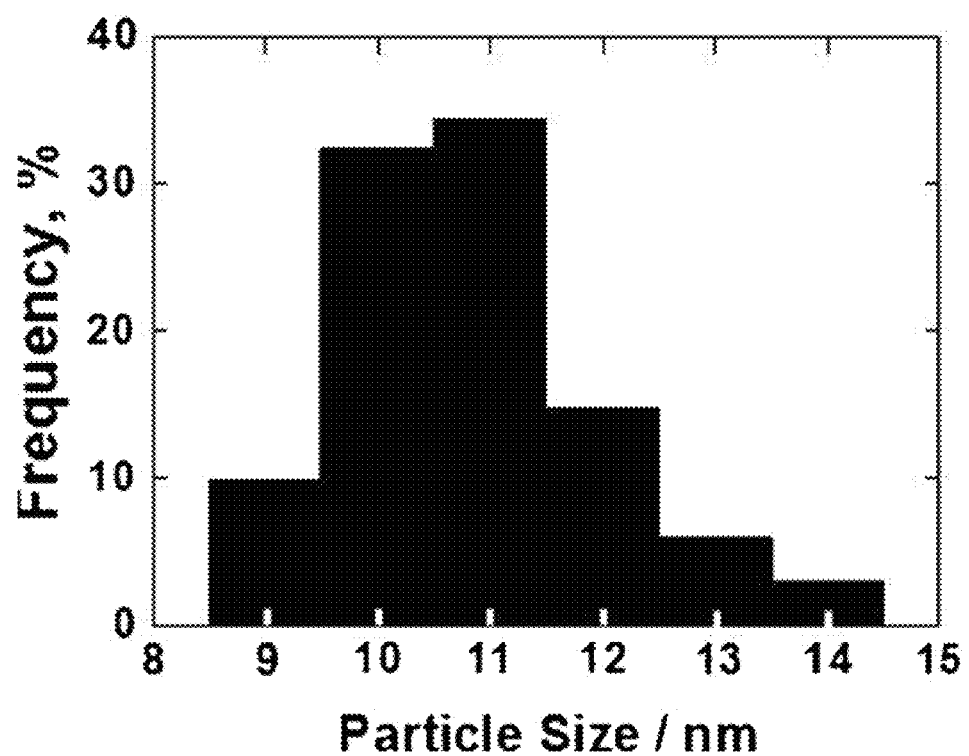
FIG. 4A is a histogram depicting the particle size distribution of pamoic acid capped gold nanoparticles prepared using an excess 100 μL volume of 1M NaOH.
Figure 4B:
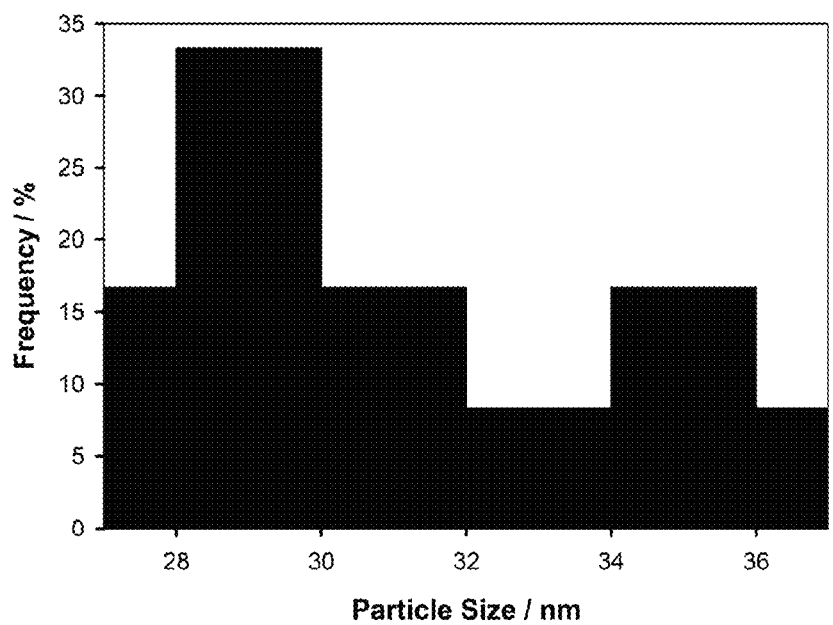
FIG. 4B is a histogram depicting the particle size distribution of pamoic acid capped gold nanoparticles prepared using an excess 20 μL volume of 1M NaOH

Transmission Electron Microscopy (TEM) Analysis of the Prepared Gold Nanoparticles The synthesized gold nanoparticles were observed and images recorded via transmission electron microscopy (TEM). FIG. 3A is the TEM image of citrate capped gold nanoparticles. The TEM image shows the monodisperse gold nanoparticles with an average size of 11.37±0.91 nm which is lower than a reported value. FIG. 3B is the TEM image of pamoic acid capped gold nanoparticles prepared with a 100 µL of 1.0 M NaOH which were prepared exactly according to the original method originally reported by the inventors. The pH of this gold nanoparticle solution was 8.12. At this pH, the size of the formed gold nanoparticles is 10.7±0.8 nm (FIG. 4A) which is close to that of the inventors' previous report (10.8±1.2 nm). This is a clear indication that the developed method is reproducible. FIG. 3C, FIG. 3D and FIG. 3F are the TEM images of pamoic acid capped gold nanoparticles, which were prepared using a 40 µL excess, a 20 µL excess, and a 5 µL excess volume of 1.0 M NaOH, respectively. The pH values of the corresponding solutions were 5.25, 4.50 and 3.72, respectively. At a pH of 8.1 and 5.25, the shapes of the gold nanoparticles are spherical (FIG. 3B and FIG. 3C). However, at a pH of 5.25, the prepared gold nanoparticles are totally irregular in sizes (FIG. 3C). As a result, these gold nanoparticles were eliminated from further characterization. The gold nanoparticles which were formed at a pH of 4.5 are different in shape (some are triangular, some are rectangular, some are pentagonal, some are rod type, etc.) (FIG. 3D and FIG. 3E). The average size of these gold nanoparticles is 31.11±3.67 nm (FIG. 4B). The gold nanoparticles synthesized at a pH of 3.72 are the biggest amongst the synthesized gold nanoparticles, and have an average size of 75.64±15.69 nm (FIG. 3F). The gold nanoparticles formed at a pH of 3.72 are triangular, pentagonal and hexagonal, which are clearly observed from the TEM images (FIG. 3F).

Example 8

Figure 5A:
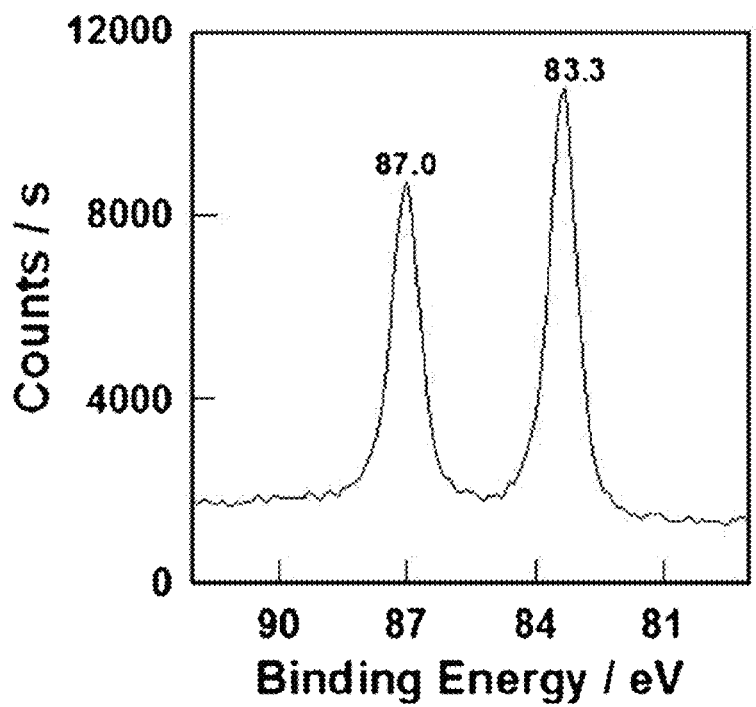
FIG. 5A is an X-ray photoelectron spectroscopy (XPS) spectra of pamoic acid capped gold nanoparticles showing gold (Au) peaks.

X-Ray Photoelectron Spectroscopy (XPS) Analysis of the Prepared Gold Nanoparticles The present gold nanoparticles prepared with pamoic acid were analyzed by X-ray photoelectron spectroscopy (XPS). The purified gold nanoparticles showed only two peaks (FIG. 5A) at 83.3 and 87.0 eV corresponding to the Au 4f$_{7/2}$ and Au 4f$_{5/2}$ core-level binding energies which confirmed

TABLE 1

Present absorption peaks in UV-Vis spectra and pH of different pamoic acid capped gold nanoparticle solutions prepared using different excess volumes of 1M NaOH

Figure 5B:
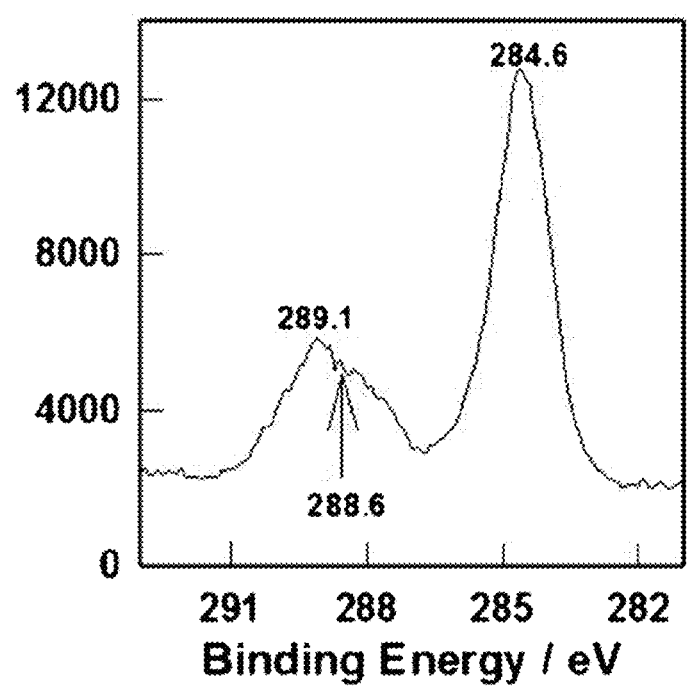
FIG. 5B is an XPS spectra of pamoic acid capped gold nanoparticles showing carbon (C) peaks.

| Excess Volume of 1M NaOH (µL) | Absorption Peak (nm) | pH |
| --- | --- | --- |
| 100 | 517, 285, 329 | 8.12 |
| 40 | 538, 335, 285 | 5.25 |
| 20 | 542, 299 | 4.50 |
| 5 | 562, 399, 305 | 3.72 | the presence of only metallic gold ($Au^0$) in the gold nanoparticles. Additionally, the C is peaks (FIG. 5B) were clearly identified at 284.6, 288.6, and 289.1 eV which correspond to the —C—C—, adsorbed —$COO^-$ group on the Au surfaces, and free —$COO^-$ groups, respectively.

Example 9

Zeta Potential Analysis of the Prepared Gold Nanoparticles

Figure 6:
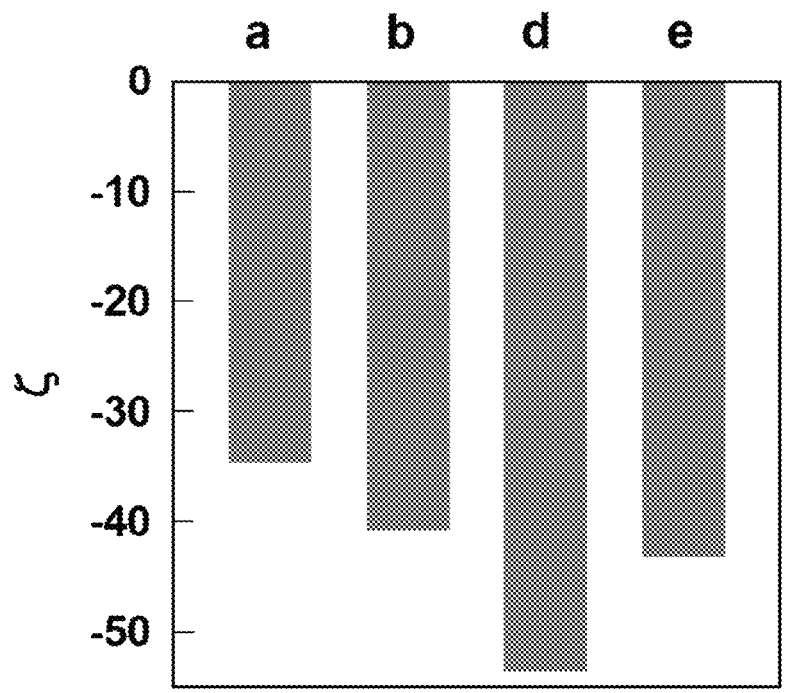
FIG. 6 is a plot of the zeta (ζ) potential of carboxylate functionalized gold nanoparticles wherein (a) is the zeta potential for citrate capped gold nanoparticles, (b) is the zeta potential for pamoic acid capped gold nanoparticles prepared by using an excess 100 μL volume of 1M NaOH, (d) is the zeta potential for pamoic acid capped gold nanoparticles prepared by using an excess 20 μL volume of 1M NaOH, and (e) is the zeta potential for pamoic acid capped gold nanoparticles prepared by using an excess 5 μL volume of 1M NaOH.

The synthesized gold nanoparticles were analyzed to record a zeta potential G-potential) measurement, which is an important parameter in assessing the stability of the colloidal gold nanoparticless. Generally, highly stable colloidal naoparticless are required for practical purposes. Before recording the zeta potential, all the unbounded citrates or pamoates were removed by centrifugation, and the precipitated gold nanoparticles were redispersed in deionized water. FIG. 6 shows the zeta potential of different gold nanoparticles. All pamoic acid capped gold nanoparticles showed higher zeta potential values than that of the citrate capped gold nanoparticles, and the highest zeta potential value was observed for the gold nanoparticles prepared with a 20 μL excess of 1.0 M NaOH and having an average particle size of 31.1±3.8 nm. The cause of the higher stability of the pamoic acid capped gold nanoparticles is thought to arise as a result of the existence of the two carboxylic acid groups of pamoic acid.

Example 10

Fluorescence Analysis of the Reactants and the Prepared Gold Nanoparticles

Figure 7A:
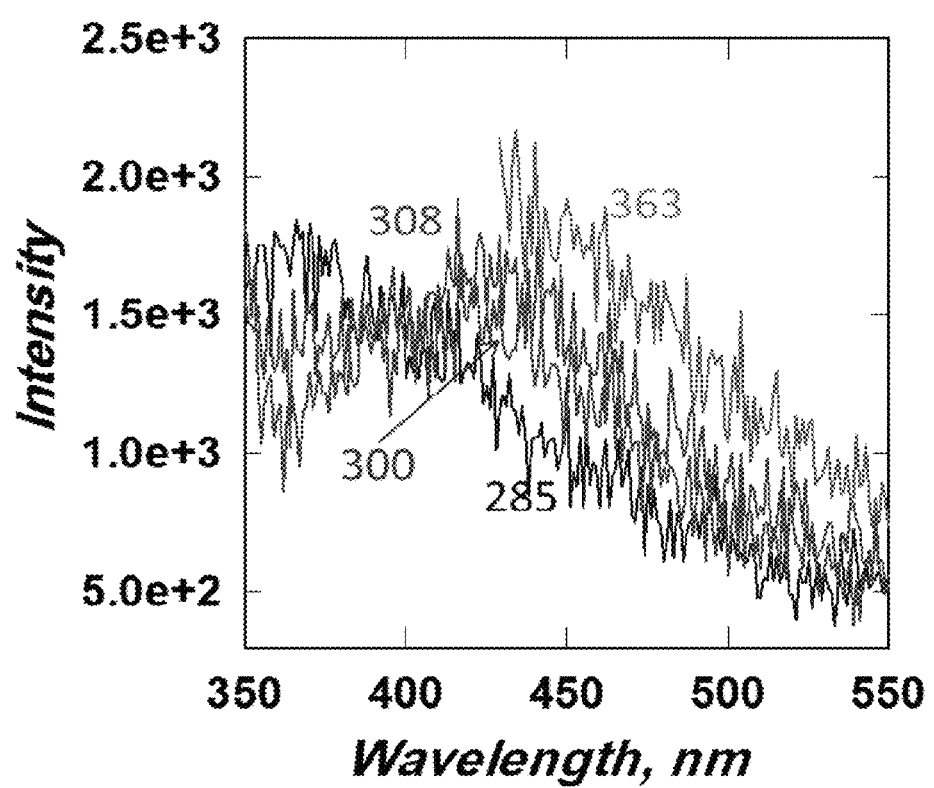
FIG. 7A is a fluorescence spectra of 0.25 mM $Na_3$-citrate with excitation at the indicated wavelength (nm) for 30 s.
Figure 7B:
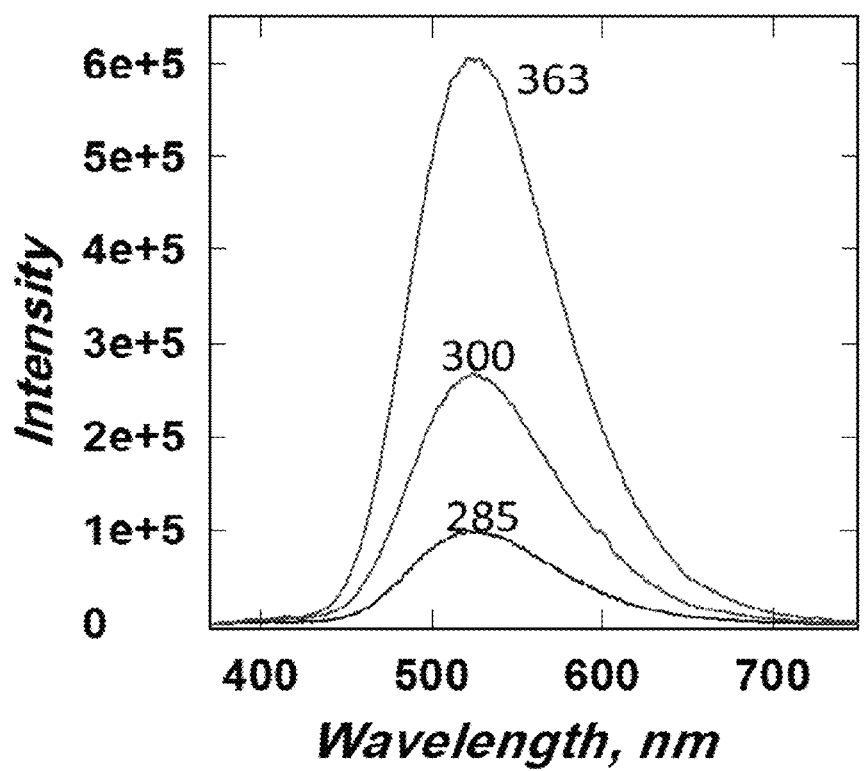
FIG. 7B is a fluorescence spectra of 0.25 mM pamoic acid in 0.5 mM NaOH with excitation at the indicated wavelength (nm) for 30 s.

Before comparison of the fluorescent properties of the citrate capped gold nanoparticles and pamoic acid capped gold nanoparticles, the fluorescent properties of the sodium salt precursors were assessed. The fluorescent properties of the $Na_3$-citrate (FIG. 7A) and $Na_2$-pamoic acid (FIG. 7B) were measured after excitation for 30 seconds at different wavelengths. The excitation wavelengths ($\lambda_{ex}$) of both reductants were selected according to the absorption peaks of $Na_2$-pamoic acid (FIG. 2A, (b)) for proper comparison as there were no observed absorption peaks for $Na_3$-citrate in the entire tested wavelength region. Additionally, the $\lambda_{ex}$ for pamoic acid capped gold nanoparticles and citrate capped gold nanoparticles was selected according to the absorption peaks of pamoic acid capped gold nanoparticles (FIG. 2B, (b)). FIG. 7A and FIG. 7B show the emission spectra of 0.25 M $Na_3$-citrate (aq.) and 0.25 mM $Na_2$-pamoic acid (aq.), respectively. The emission spectra of $Na_2$-pamoic acid were recorded with excitation for 30 s at 285, 300, 329 and 363 nm wavelengths (FIG. 7B). In addition, the emission spectra of $Na_3$-citrate were recorded with all the $\lambda_{ex}$ used for $Na_2$-pamoic acid and 308 nm is previously reported [Abdelhalim M A K, Mady M M, Ghannam M M (2012) J Nanomed Nanotechol 3: 133, doi:10.4172/2157-7439.1000133—incorporated herein by reference in its entirety]. Also, the excitations at 308 nm were performed to record the emission spectra of citrate capped gold nanoparticles and pamoic acid capped gold nanoparticles prepared with a 100 μL excess of 1.0 M NaOH for proper comparison.

The emission spectra of $Na_2$-pamoic acid with different $\lambda_{ex}$ shows a broad envelope of intensity stretching from 420 to 720 nm with the maximum peak centered at 525 nm. The highest fluorescence property of $Na_2$-pamoic acid was observed with excitation at 363 nm. In contrast, very poor fluorescence intensity is observed for the $Na_3$-citrate which is expected as no absorption of light was observed in the UV-Vis experiments (FIG. 2A, (a)). The maximum emission peak of $Na_3$-citrate is centered at all excitation wavelengths except 363 nm. At the 363 nm excitation wavelength, the Raman scattering peak of water appears at 414.1 nm. As a result the weak emission peak of $Na_3$-citrate with 363 nm $\lambda_{ex}$ was not possible to obtain.

Figure 7C:
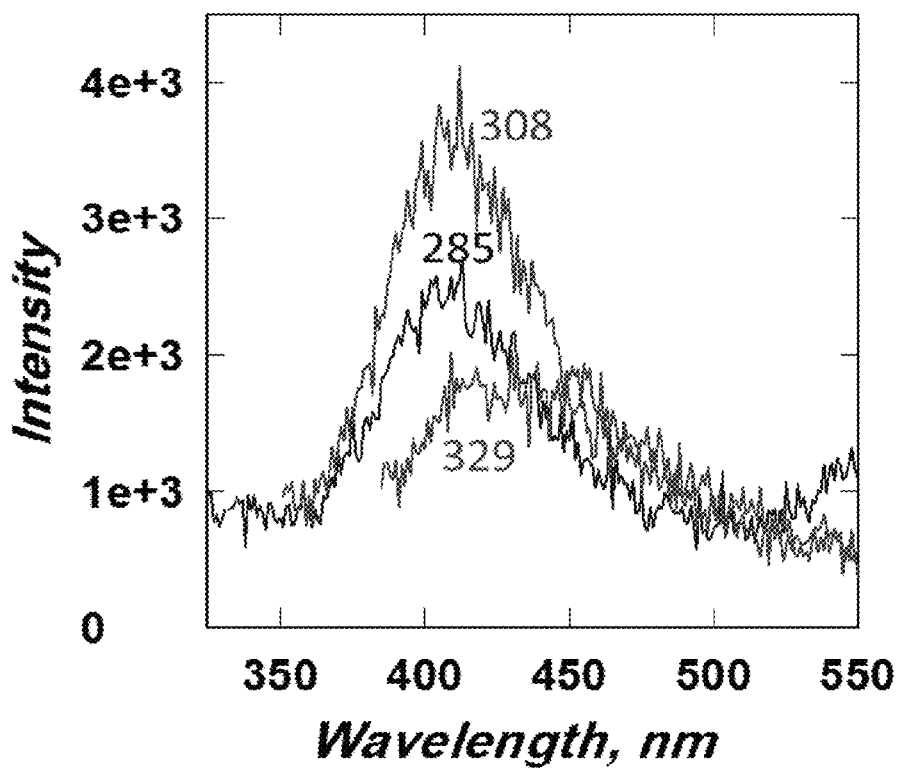
FIG. 7C is a fluorescence spectra of citrate capped gold nanoparticles with excitation at the indicated wavelength (nm) for 30 s.
Figure 7D:
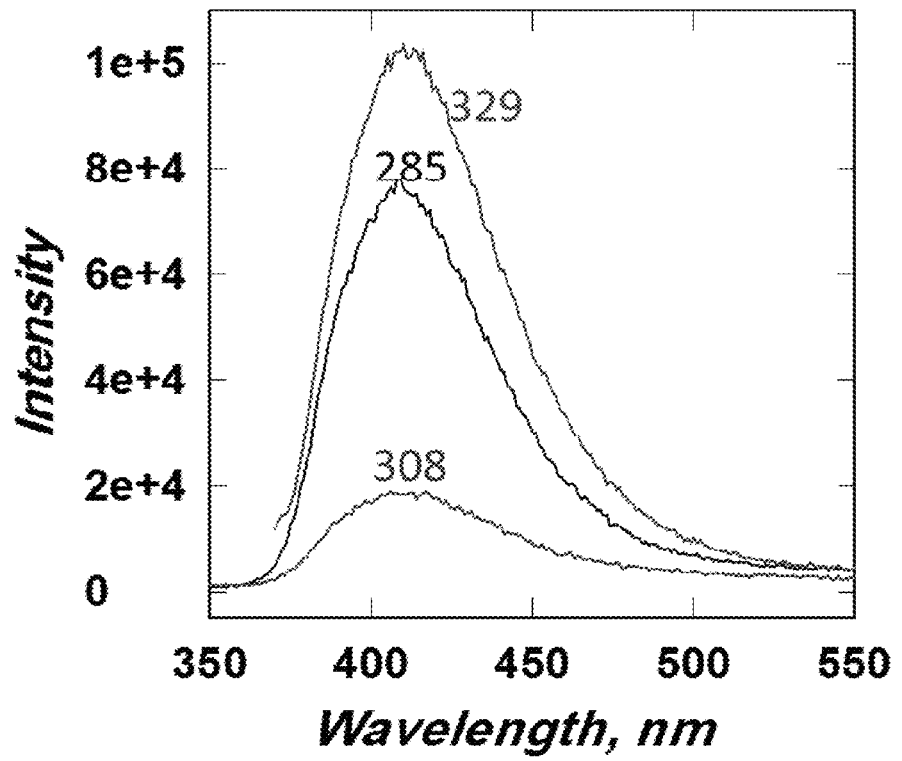
FIG. 7D is a fluorescence spectra of pamoic acid capped gold nanoparticles prepared using an excess 100 μL volume of 1M NaOH with excitation at the indicated wavelength (nm) for 30 s.
Figure 7E:
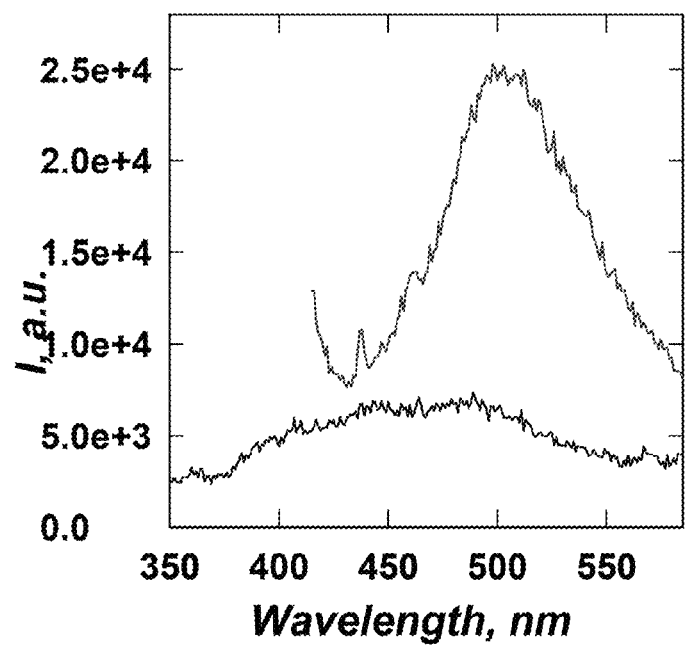
FIG. 7E is a fluorescence spectra of pamoic acid capped gold nanoparticles prepared using an excess 20 μL volume of 1M NaOH with excitation at the indicated wavelength (nm) for 30 s.
Figure 7F:
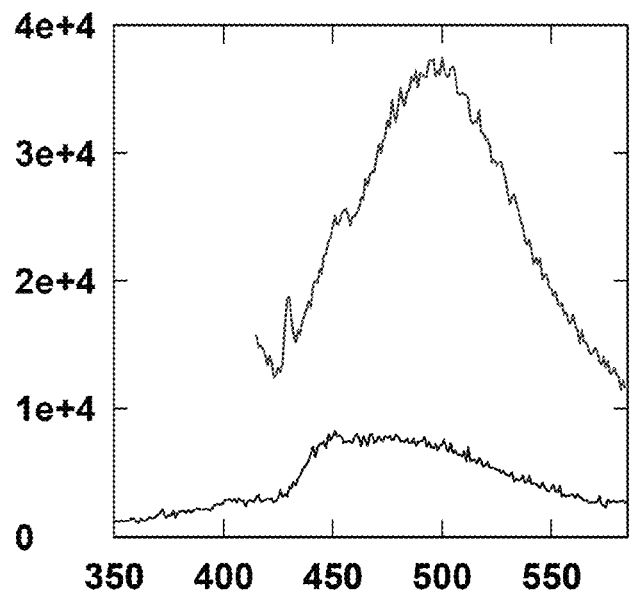
FIG. 7F is a fluorescence spectra of pamoic acid capped gold nanoparticles prepared using an excess 5 μL volume of 1M NaOH with excitation at the indicated wavelength (nm) for 30 s.
Figure 8:
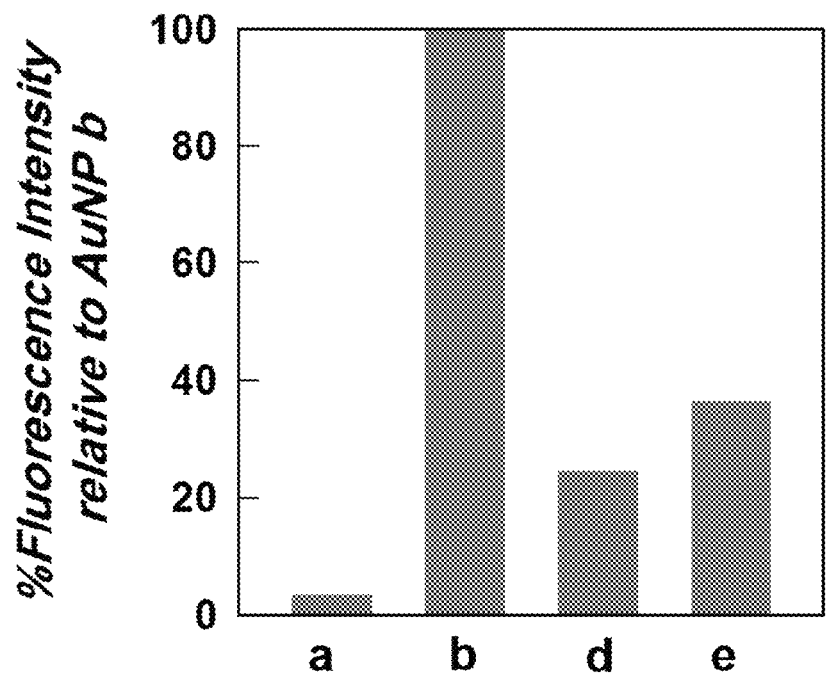
FIG. 8 illustrates fluorescence intensities relative to pamoic acid capped gold nanoparticles prepared by using an excess 100 μL volume of 1M NaOH wherein (a) is the relative fluorescence intensity for citrate capped gold nanoparticles, (b) is the relative fluorescence intensity for pamoic acid capped gold nanoparticles prepared by using an excess 100 μL volume of 1M NaOH, (d) is the relative fluorescence intensity for pamoic acid capped gold nanoparticles prepared by using an excess 20 μL volume of 1M NaOH, and (e) is the relative fluorescence intensity for pamoic acid capped gold nanoparticles prepared by using an excess 5 μL volume of 1M NaOH.
Figure 9A:
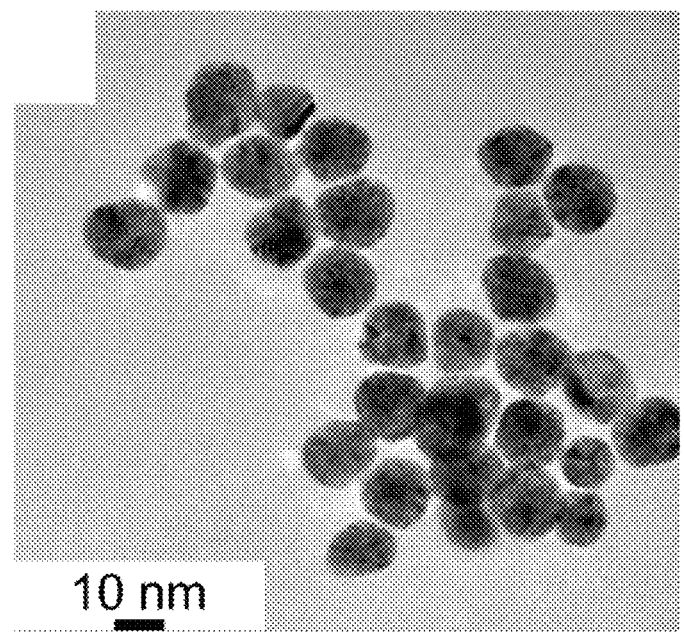
FIG. 9A is a TEM image of the pamoic acid capped gold nanoparticles prepared by seeding with 5 mL of pamoic acid capped gold nanoparticles prepared using an excess 100 μL volume of 1M NaOH.
Figure 9B:
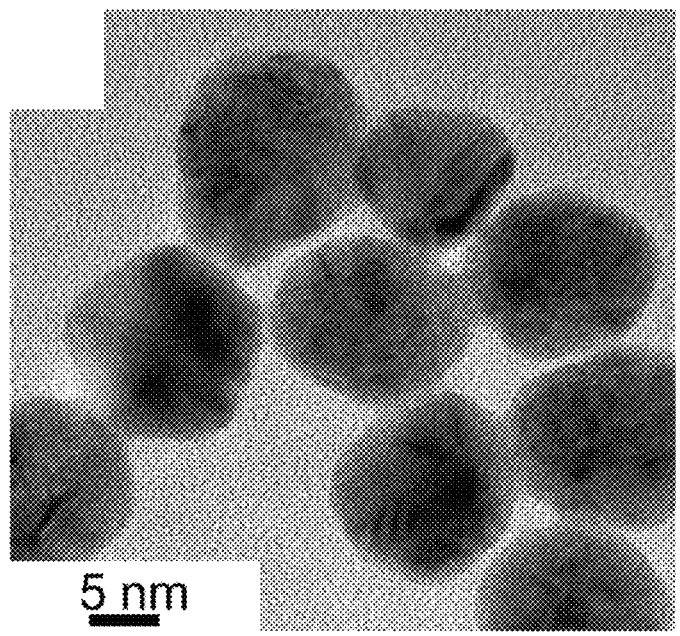
FIG. 9B is a TEM image of the magnified view of the pamoic acid capped gold nanoparticles prepared by seeding with 5 mL of pamoic acid capped gold nanoparticles prepared using an excess 100 μL volume of 1M NaOH.
Figure 9C:
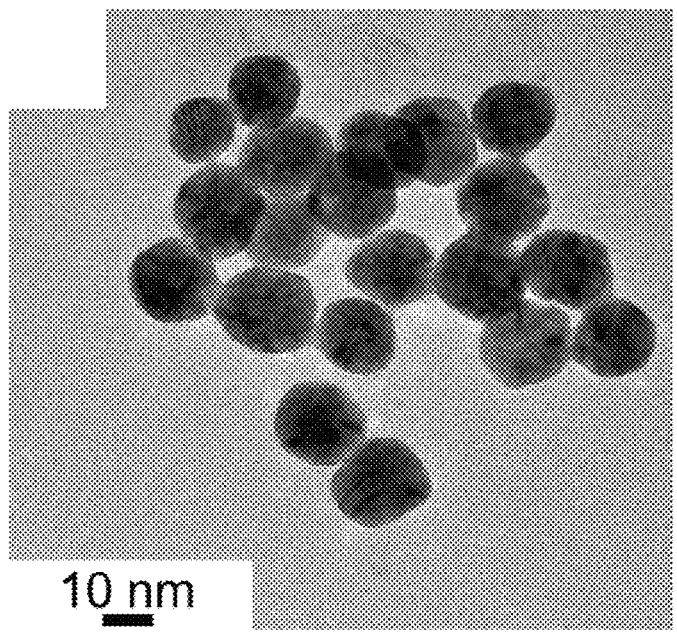
FIG. 9C is a TEM image of the pamoic acid capped gold nanoparticles prepared by seeding with 2.5 mL of pamoic acid capped gold nanoparticles prepared using an excess 100 μL volume of 1M NaOH.
Figure 9D:
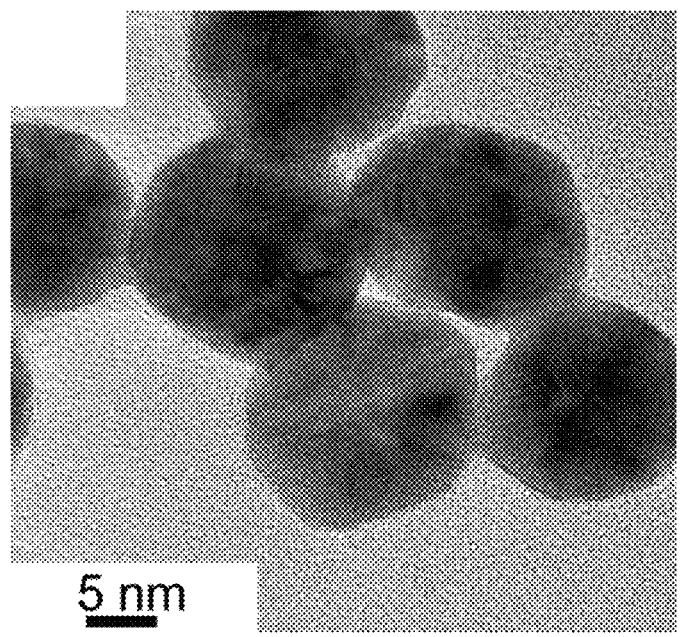
FIG. 9D is a TEM image of the magnified view of the pamoic acid capped gold nanoparticles prepared by seeding with 2.5 mL of pamoic acid capped gold nanoparticles prepared using an excess 100 μL volume of 1M NaOH.
Figure 10A:
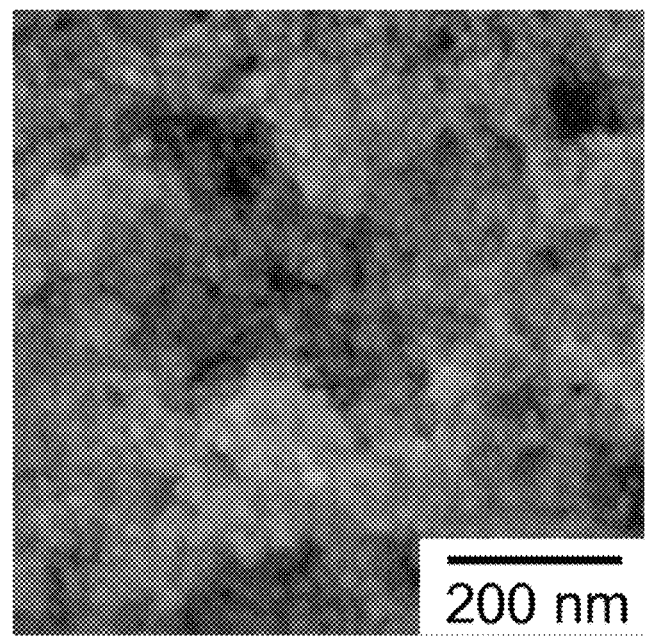
FIG. 10A is a field emission scanning microscopy (FESEM) image of the pamoic acid capped gold nanoparticles prepared by seeding with 5 mL of pamoic acid capped gold nanoparticles prepared using an excess 100 μL volume of 1M NaOH.
Figure 10B:
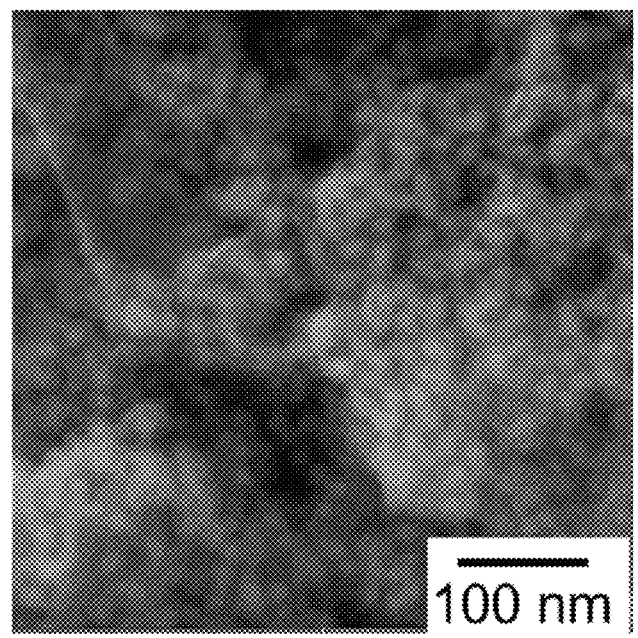
FIG. 10B is a FESEM image of the magnified view of the pamoic acid capped gold nanoparticles prepared by seeding with 5 mL of pamoic acid capped gold nanoparticles prepared using an excess 100 μL volume of 1M NaOH.
Figure 10C:
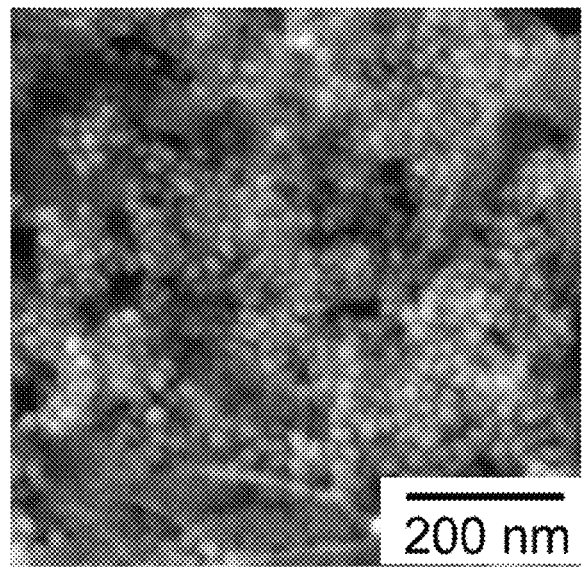
FIG. 10C is a FESEM image of the pamoic acid capped gold nanoparticles prepared by seeding with 2.5 mL of pamoic acid capped gold nanoparticles prepared using an excess 100 μL volume of 1M NaOH.
Figure 10D:
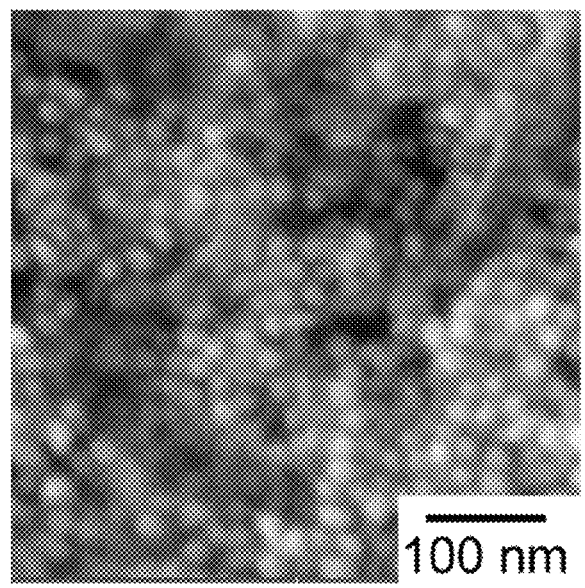
FIG. 10D is a FESEM image of the magnified view of the pamoic acid capped gold nanoparticles prepared by seeding with 2.5 mL of pamoic acid capped gold nanoparticles prepared using an excess 100 μL volume of 1M NaOH.

FIG. 7C is the emission spectra of citrate capped gold nanoparticles with different $\lambda_{ex}$, and emission peaks appeared at 411, 413 and 430 nm with excitation at 285, 308 and 329 nm, respectively. The emission spectra show that the highest intensity appeared with excitation at 308 nm. The cause of these emission spectra might be excitation of the surface plasmon coherent electronic motion as well as the d electrons as previously reported. FIG. 7D shows the emission spectra of pamoic acid capped gold nanoparticles prepared with a 100 μL excess of 1.0 M NaOH with peaks at the same position (408 nm) with the excitation at 285, 308 and 329 nm. The highest intensity appeared with excitation at 329 nm (FIG. 7D) which is one of the absorption peaks of these gold nanoparticles (FIG. 2B, (b)). The emission peak intensity of these pamoic acid capped gold nanoparticles is 17 times higher than that of the citrate capped gold nanoparticles. These experiments clearly indicate that the gold nanoparticles prepared by pamoic acid possess significantly higher fluorescent properties than that of gold nanoparticles prepared by the conventional citrate method. For further comparison, the emission spectra of 31.11 nm and 75.64 nm pamoic acid capped gold nanoparticles, prepared with a 20 μL (FIG. 7E) and 5 μL (FIG. 7F) excess of 1.0 M NaOH respectively, were measured with different $\lambda_{ex}$, which were selected according to the absorption peaks of the respective pamoic acid capped gold nanoparticles in the UV spectra (FIG. 2B, (d) and (e)). However, the excitation with 399 nm shows the highest emission peak centered at 500 nm for both cases. This is reasonable as the 75.6 nm gold nanoparticles show an absorption peak (FIG. 2B, (e)) and the 31.1 nm gold nanoparticles show high absorption at ~399 nm (FIG. 2B, (d)). The 31.1 nm and 75.6 nm pamoic acid capped gold nanoparticles showed higher fluorescence than that of the citrate capped gold nanoparticles. Yet, the fluorescence intensity of pamoic acid capped gold nanoparticles prepared with a 100 μL excess of 1.0 M NaOH is the highest among the tested gold nanoparticles (FIG. 8).

Example 11

Analysis of Gold Nanoparticles Prepared by the Seed Mediated Growth Approach

Figure 11A:
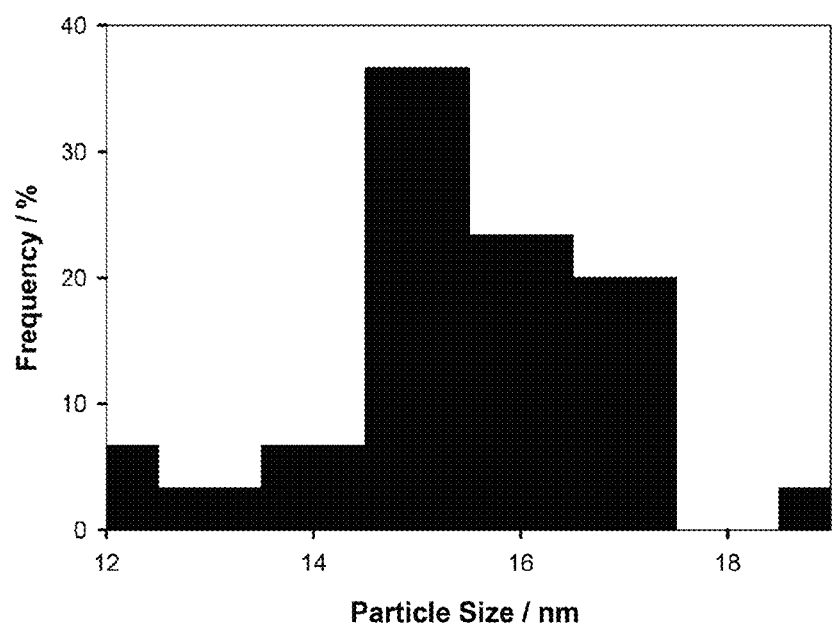
FIG. 11A is a histogram depicting the particle size distribution of the pamoic acid capped gold nanoparticles prepared by seeding with 5 mL of pamoic acid capped gold nanoparticles prepared using an excess 100 μL volume of 1M NaOH.
Figure 11B:
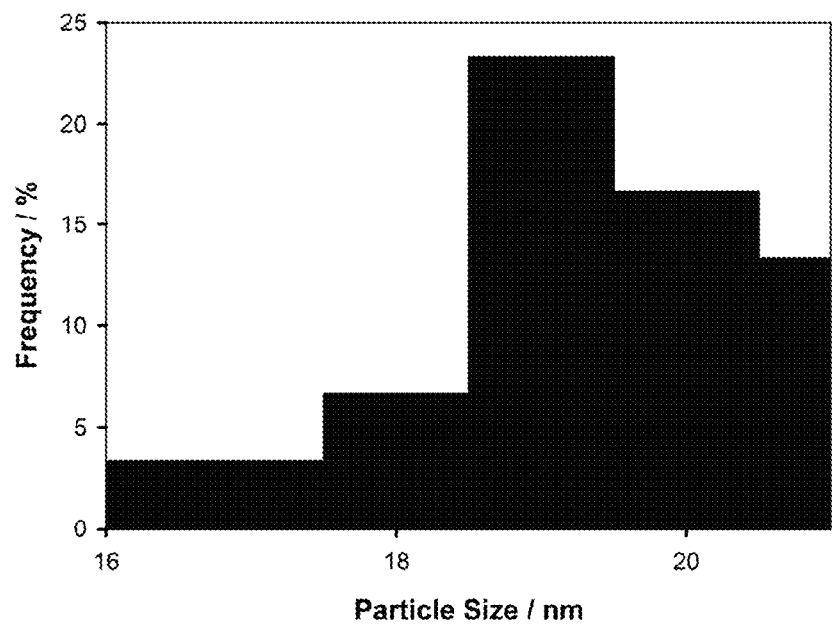
FIG. 11B is a histogram depicting the particle size distribution of the pamoic acid capped gold nanoparticles prepared by seeding with 2.5 mL of pamoic acid capped gold nanoparticles prepared using an excess 100 μL volume of 1M NaOH.

In separate experiments, the size controlled preparation of spherical gold nanoparticles was developed by a seed mediated growth approach. Here, the pamoic acid capped gold nanoparticles prepared with a 100 μL excess of 1.0 M NaOH (5 mL or 2.5 mL) were poured as seed to the growth solution (mixture of 10 mL of 1.34 mM $HAuCl_4$ and 10 mL of 2 mM $Na_z$-pamoic acid) under stirring at 200 rpm, and stirring continued for 24 hours. After treating with growth solution, sizes of 15.5±1.4 nm (FIG. 9A, FIG. 9B, FIG. 10A and FIG. 10B) and 19.3±1.4 nm (FIG. 9C, FIG. 9D, FIG. 10C and FIG. 10D) spherical shaped gold nanoparticles were observed for using the 5 and 2.5 mL of gold nanoparticle seed, respectively. This result indicates that the $AuCl_4^-$ reduced on the surface of monodispersed Au seed rather than forming separate gold nanoparticle seed in the growth solution. As a result, good monodispersion of bigger sizes of gold nanoparticles were achieved through this seed mediated growth approach (FIG. 11A and FIG. 11B).

Figure 12A:
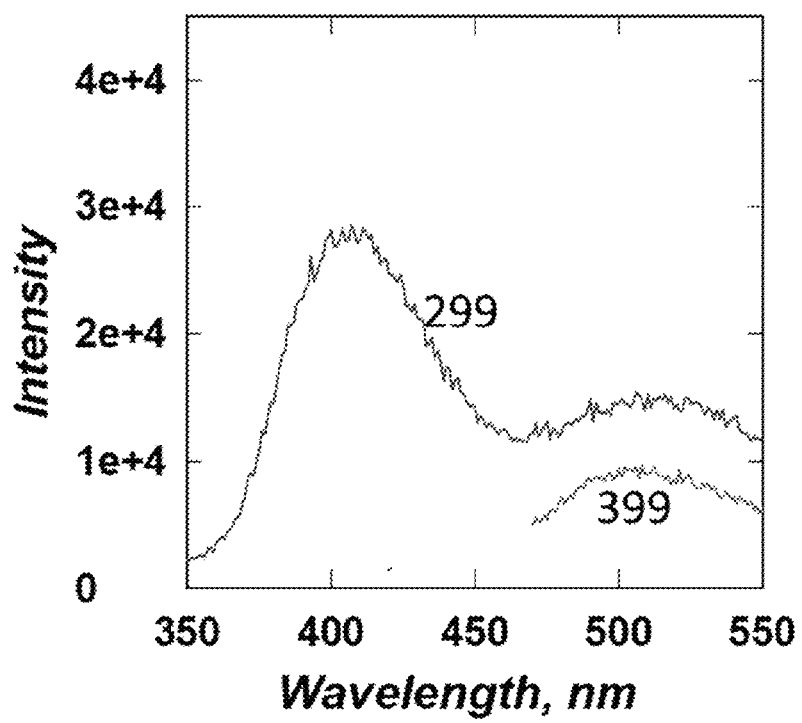
FIG. 12A is a fluorescence spectra of pamoic acid capped gold nanoparticles prepared by seeding with 5 mL of pamoic acid capped gold nanoparticles prepared using an excess 100 μL volume of 1M NaOH with excitation at the indicated wavelength (nm) for 30 s.
Figure 12B:
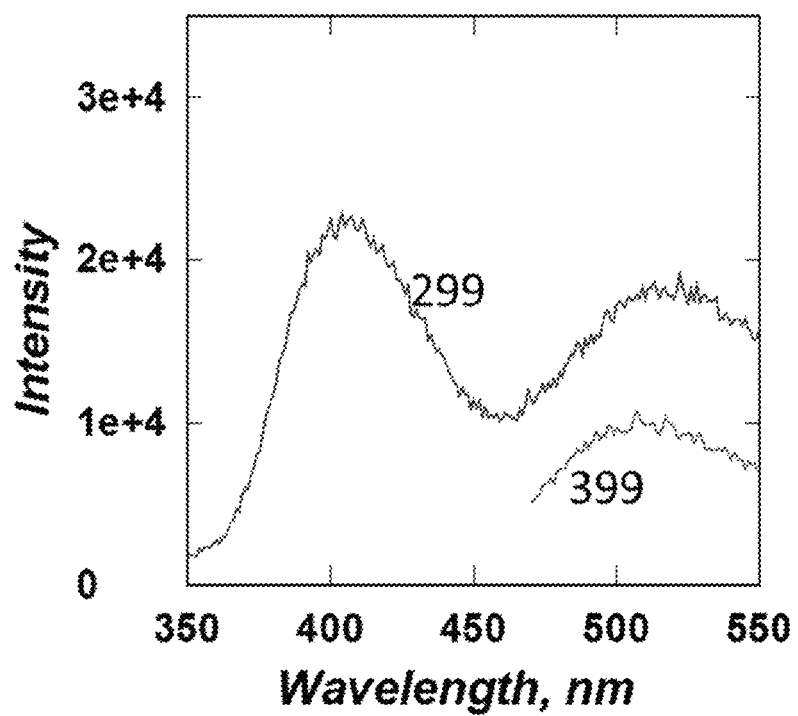
FIG. 12B is a fluorescence spectra of pamoic acid capped gold nanoparticles prepared by seeding with 2.5 mL of pamoic acid capped gold nanoparticles prepared using an excess 100 μL volume of 1M NaOH with excitation at the indicated wavelength (nm) for 30 s.

The UV spectra of gold nanoparticles produced by the seed mediated growth approach show more or less similar behavior even though the TEM images showed different sizes. The UV absorption peaks of both types of gold nanoparticles produced by seed mediated growth appeared at 299, 399 and 530 nm. As a result, fluorescence spectra of both gold nanoparticles were recorded with $\lambda_{ex}$ at 299 and 399 nm (FIG. 12A and FIG. 12B). Both types of gold nanoparticles produced by seed mediated growth display the emission peaks at 408 nm and 516 nm with $\lambda_{ex}$ of 299 nm. The emission intensity of the 15.5±1.4 nm gold nanoparticles seeded with 5 mL of gold nanoparticle seed is slightly higher compared to the 19.3±1.4 nm gold nanoparticles at 408 nm. In the emission spectra with $\lambda_{ex}$ at 399 nm only one emission peak appears for both types of gold nanoparticles produced by seed mediated growth at 508 nm, and those intensities are much lower as compared to that with $\lambda_{ex}$ at 299 nm of the corresponding gold nanoparticles. The emission intensities of these seed mediated growth pamoic acid capped gold nanoparticles are significantly higher compared to that of the citrate capped gold nanoparticles.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for the size controlled preparation of unaggregated monodispersed pamoic acid carboxylate functionalized gold nanoparticles, comprising:
    sonicating an aqueous solution of pamoic acid and an inorganic base to form a pamoic acid salt solution having a first pH,
    adding a second amount of inorganic base to the pamoic acid salt solution to form a reducing solution having a second pH, and
    sonicating the reducing solution with an aqueous solution of chloroauric acid to form monodispersed pamoic acid carboxylate functionalized gold nanoparticles in a final solution having a third pH,
    wherein the second pH is greater than or equal to the first pH,
    wherein the average size of the monodispersed pamoic acid carboxylate functionalized gold nanoparticles is controlled by the second pH, and
    wherein one of the following conditions is satisfied:
        the third pH is greater than 6 up to 8 and the monodispersed pamoic acid carboxylate functionalized gold nanoparticles have an average particle size of less than 30 nm,
        the third pH is in the range of 4-6 and the monodispersed pamoic acid carboxylate functionalized gold nanoparticles have an average particle size of 30-70 nm, or
        the third pH is less than 4 and the monodispersed pamoic acid carboxylate functionalized gold nanoparticles have an average particle size of greater than 70 mm.

2. The method of claim 1, wherein the pamoic acid is a reducing agent for chloroauric acid and a capping agent for the formed monodispersed pamoic acid carboxylate functionalized gold nanoparticles.

3. The method of claim 1, wherein the third pH is greater than 6 and up to 8 and the monodispersed pamoic acid carboxylate functionalized gold nanoparticles have an average particle size of less than 30 nm.

4. The method of claim 1, wherein the third pH is in the range of 4-6 and the monodispersed pamoic acid carboxylate functionalized gold nanoparticles have an average particle size of 30-70 nm.

5. The method of claim 1, wherein the third pH is less than 4 and the monodispersed pamoic acid carboxylate functionalized gold nanoparticles have an average particle size of greater than 70 nm.

* * * * *